United States Patent [19]
Meester et al.

[11] Patent Number: 5,908,352
[45] Date of Patent: *Jun. 1, 1999

[54] ADJUSTABLE FOUR-WEIGHT SHAKER HEAD

[75] Inventors: David Jeffrey Meester, Fresno; Franklin Paul Orlando, Morgan Hill, both of Calif.

[73] Assignee: FMC Corporation, Chicago, Ill.

[*] Notice: This patent is subject to a terminal disclaimer.

[21] Appl. No.: 08/870,155

[22] Filed: Jun. 5, 1997

Related U.S. Application Data

[63] Continuation-in-part of application No. 08/539,918, Oct. 6, 1995, Pat. No. 5,685,773.

[51] Int. Cl.$^6$ ............................. A01D 46/00; A01D 46/26
[52] U.S. Cl. ......................... 460/113; 460/133; 460/145; 56/340.1
[58] Field of Search ..................................... 460/113, 126, 460/133, 144, 145, 146, 147, 148, 149, 150; 56/327.1, 328.1, 340.1

[56] References Cited

U.S. PATENT DOCUMENTS

| | | | |
|---|---|---|---|
| 3,413,789 | 12/1968 | Studer | 56/330 |
| 4,286,426 | 9/1981 | Orlando | 56/330 |
| 4,823,678 | 4/1989 | Sollami | 92/125 |
| 4,982,558 | 1/1991 | Korthuis | 56/12.6 |
| 5,197,269 | 3/1993 | Meester | 56/327.1 |
| 5,316,519 | 5/1994 | Johnson | 460/96 |

*Primary Examiner*—Terry Lee Melius
*Attorney, Agent, or Firm*—Pauley Petersen Kinne & Fejer

[57] ABSTRACT

The invention provides a harvesting shaker with a set of primary eccentric weights and secondary eccentric weights. The invention rotates the primary and secondary eccentric weights at the same speed, but may on the fly, using a hydraulic rotary actuator, change the rotational phase between the primary and secondary eccentric weights, causing an on the fly change of amplitude of the inventive shaker. The invention also uses a rotary valve, that does not require high pressure bearings, and that provides damping of the control system.

22 Claims, 16 Drawing Sheets

FIG_1
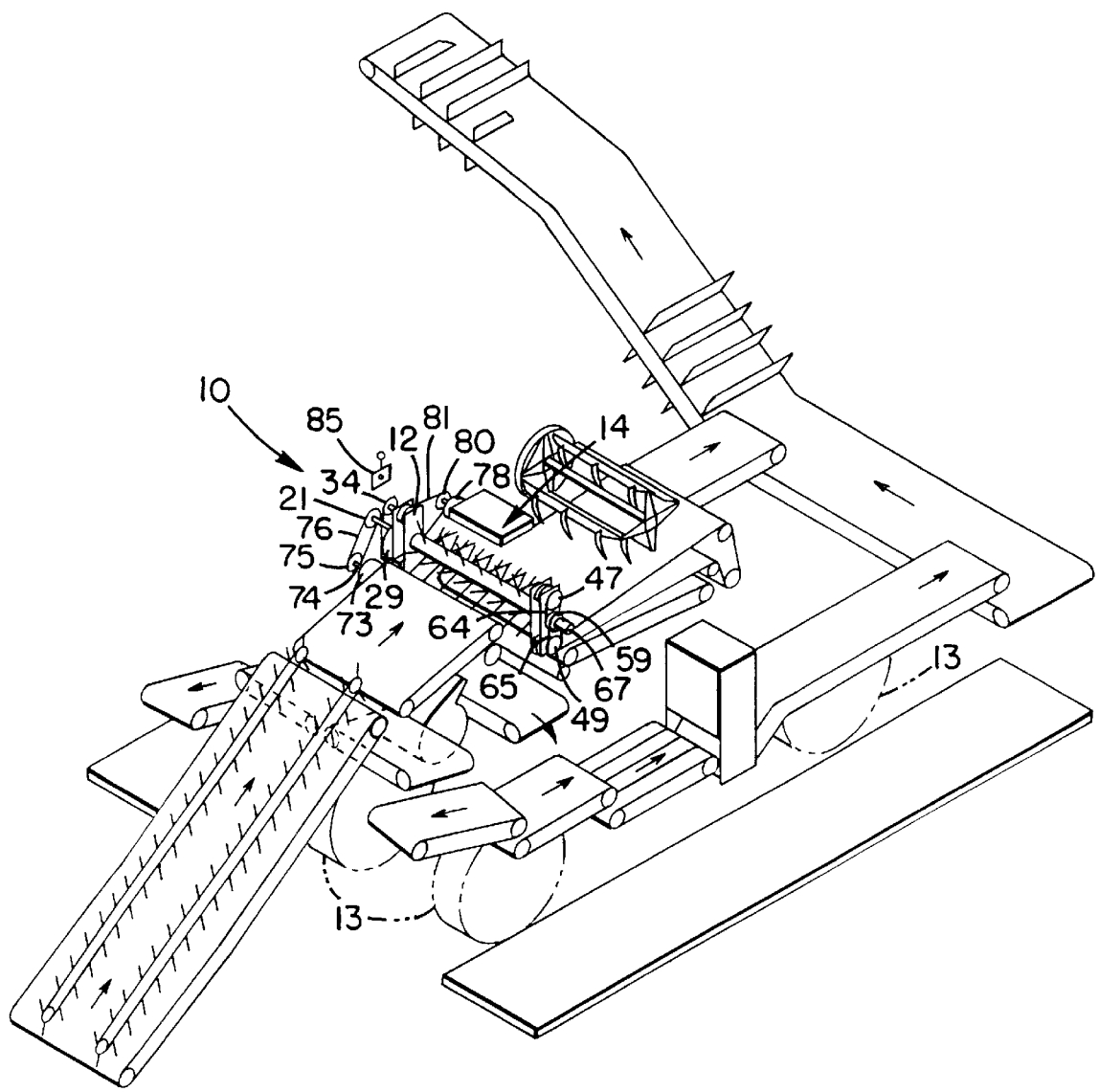

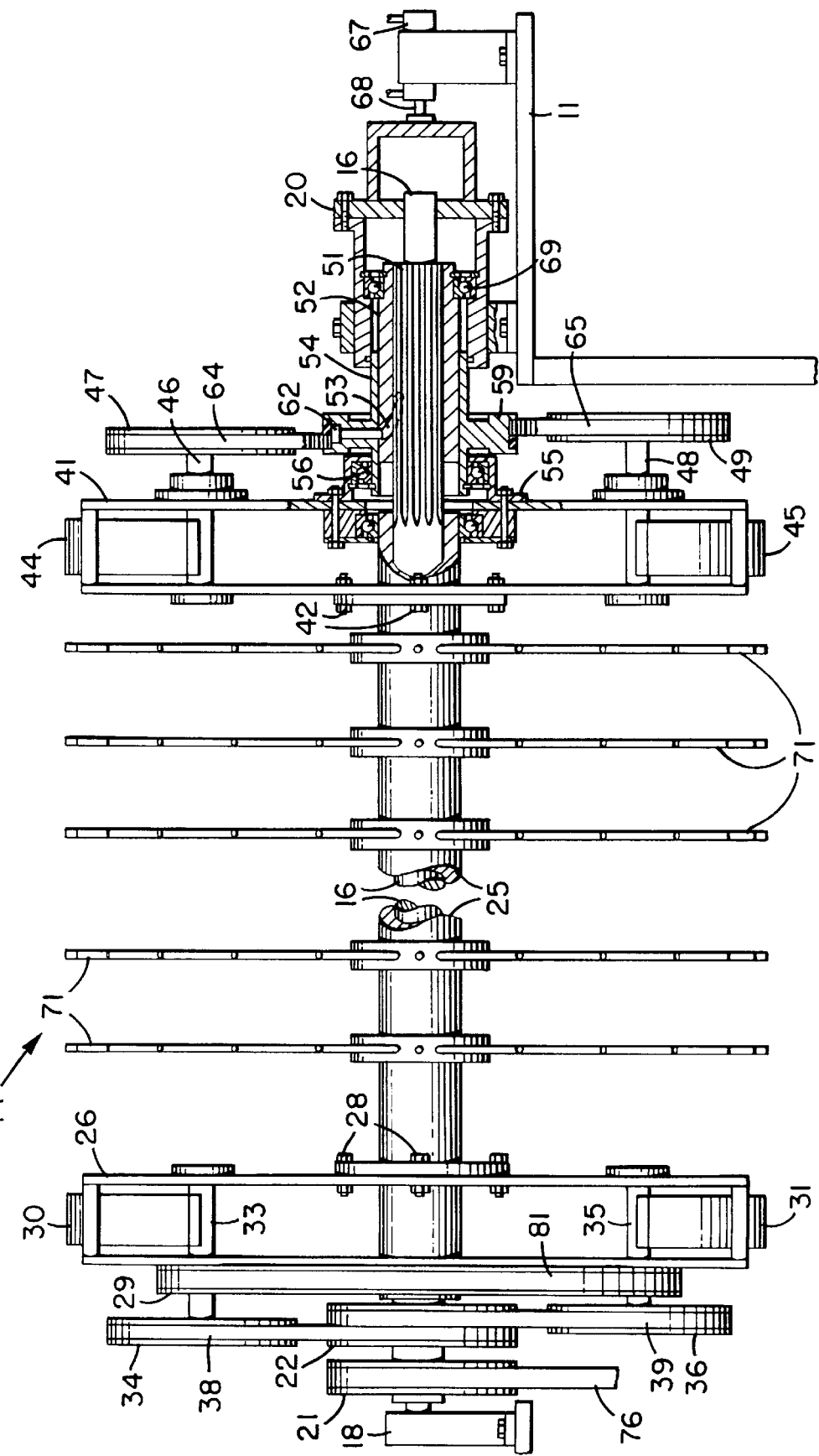
FIG_2

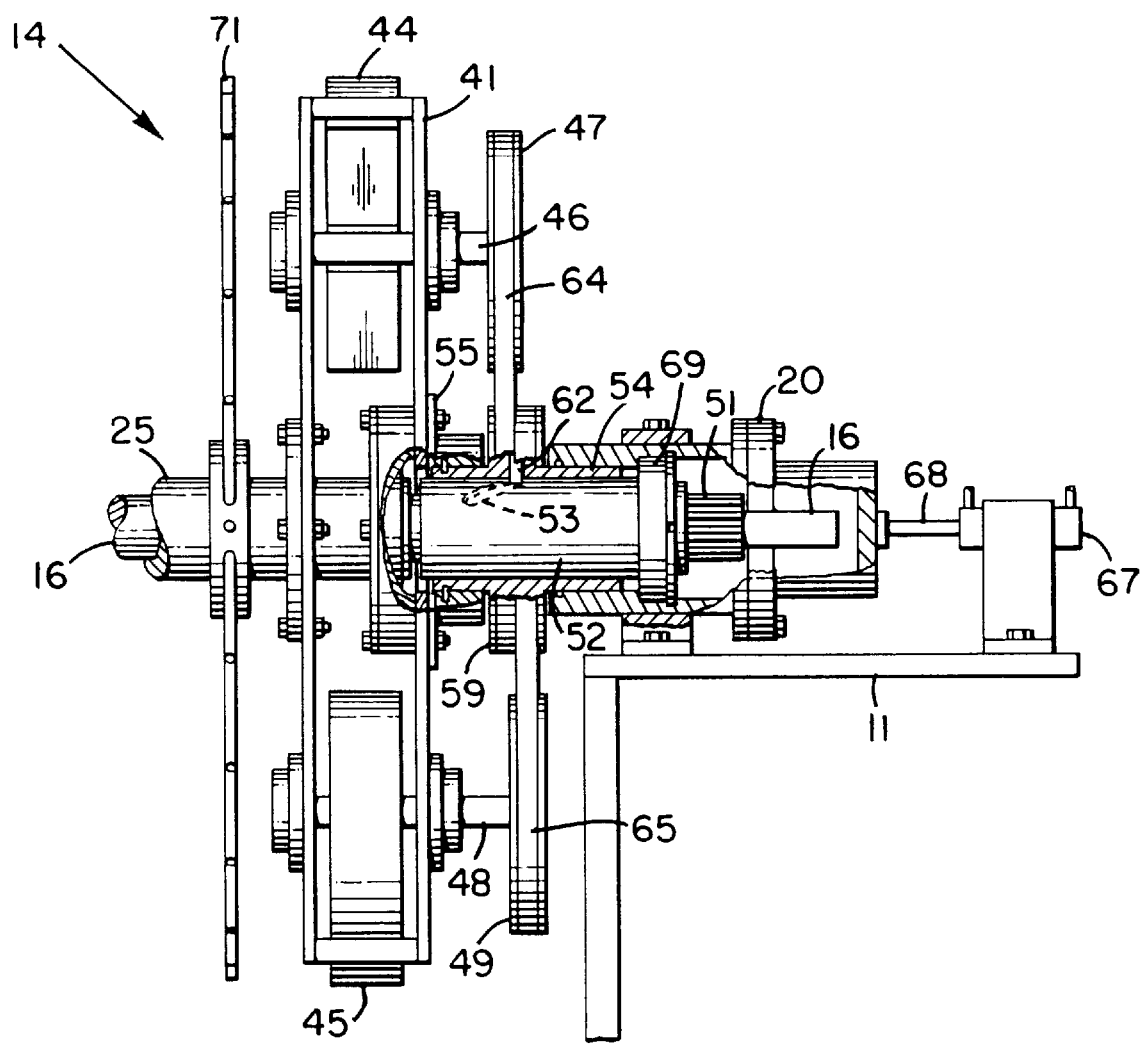
FIG_3

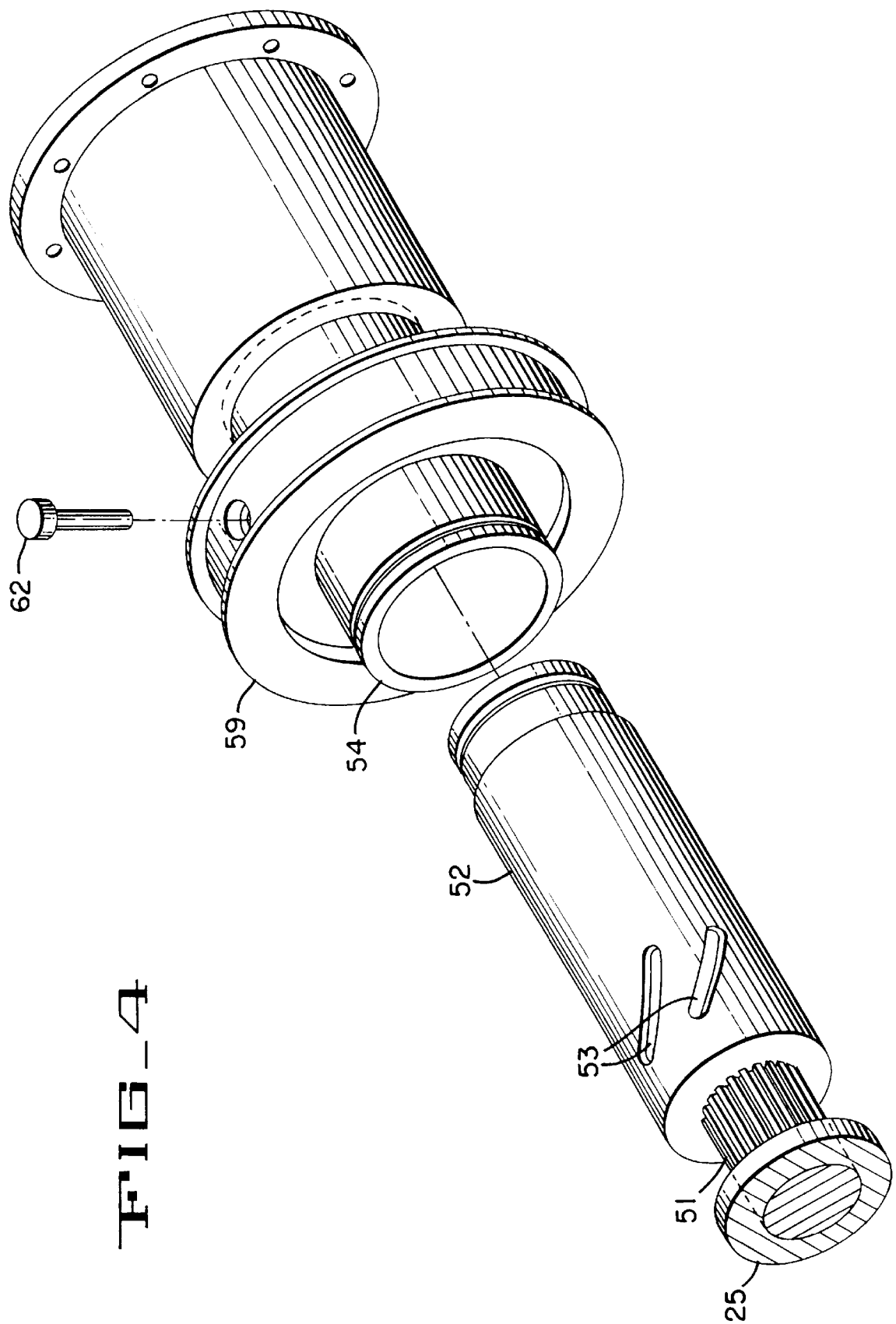

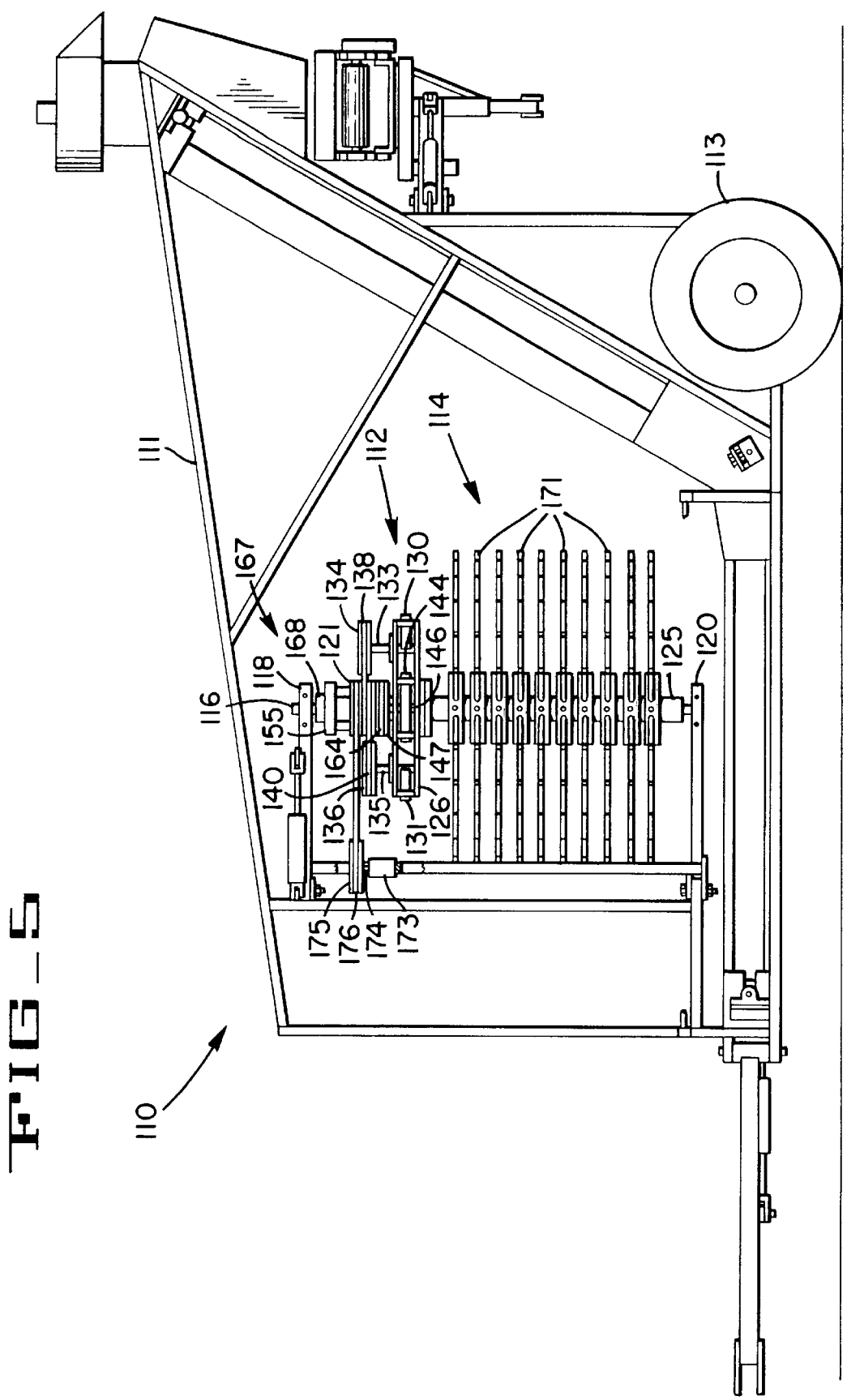
FIG_5

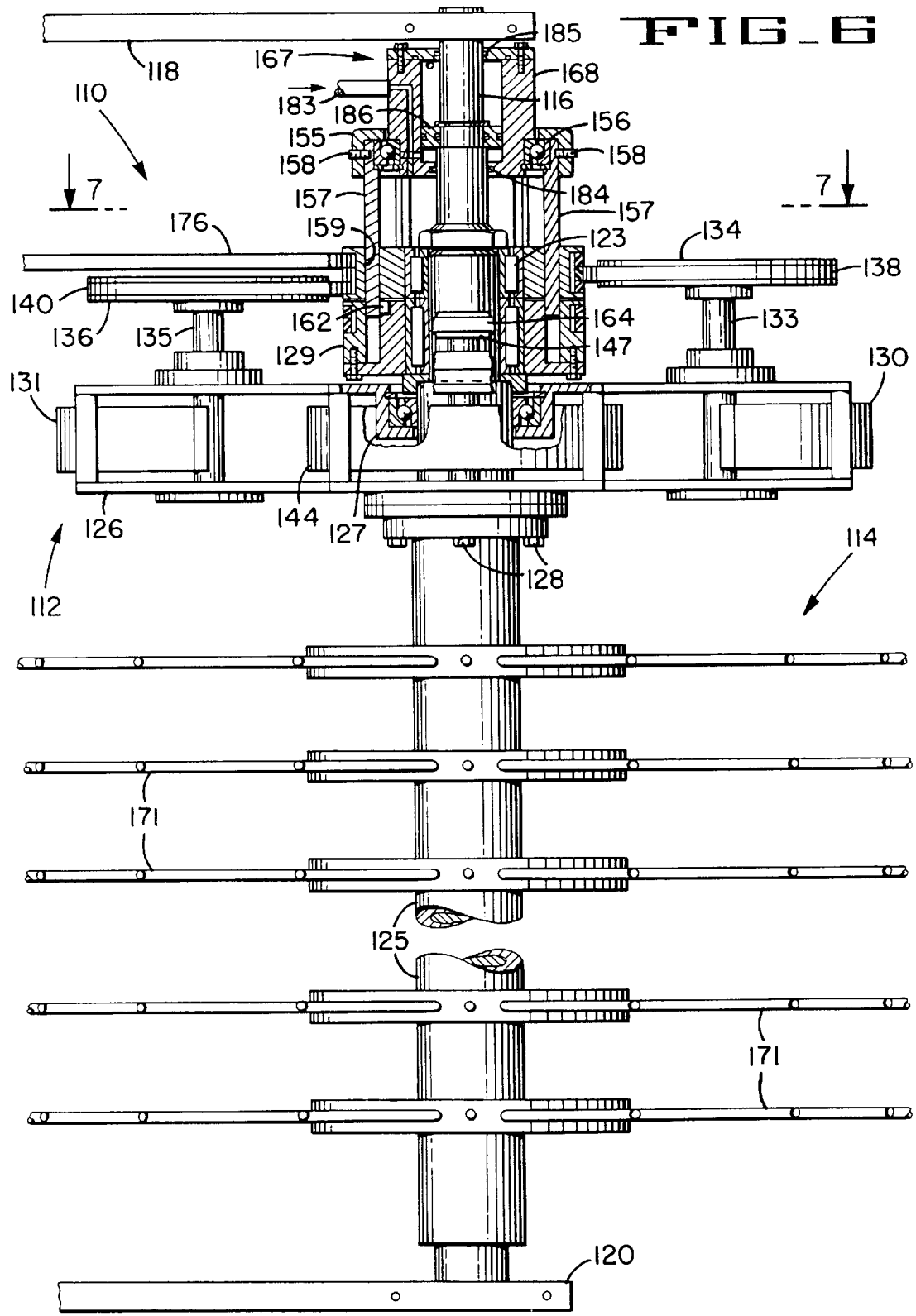

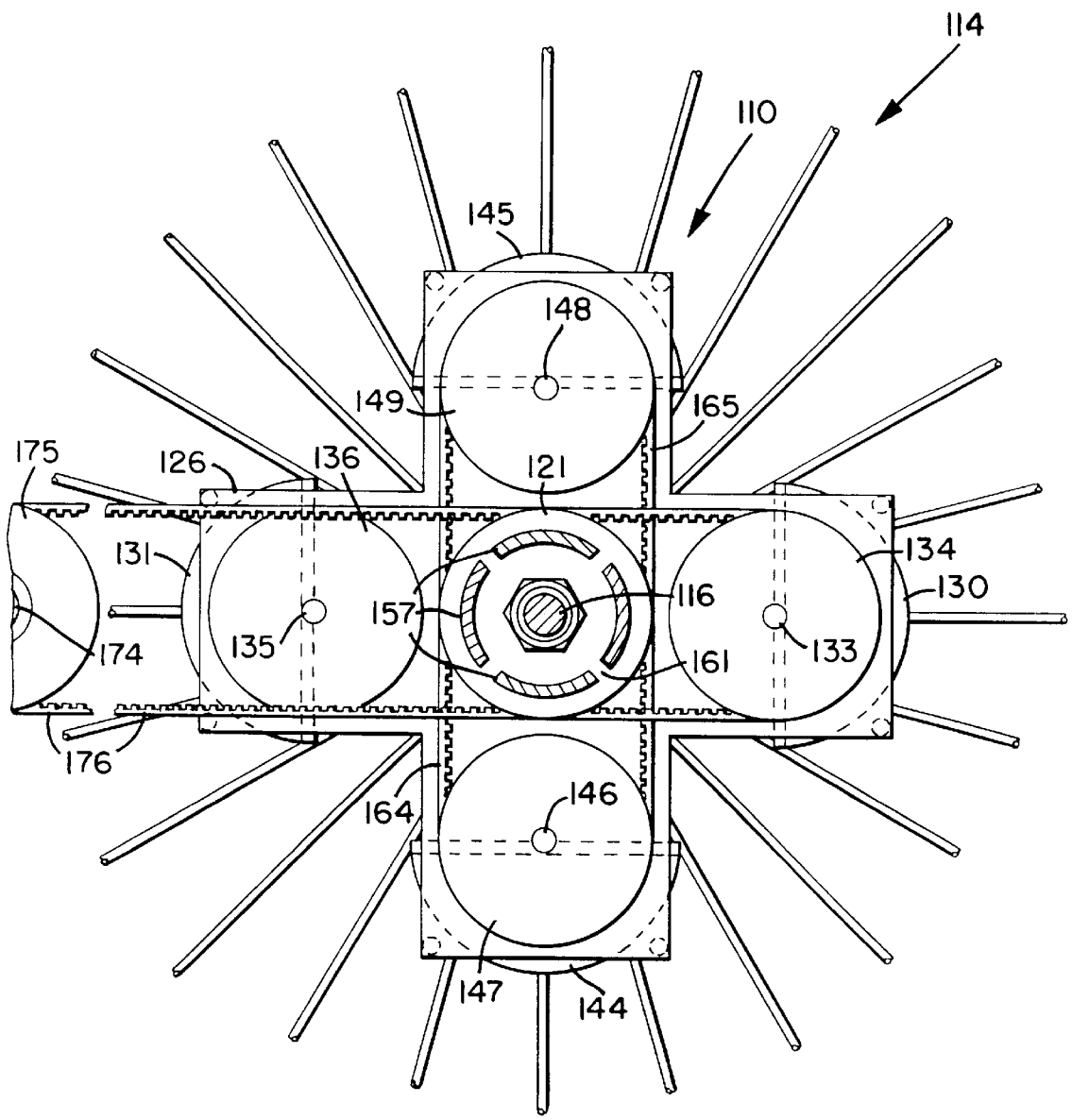

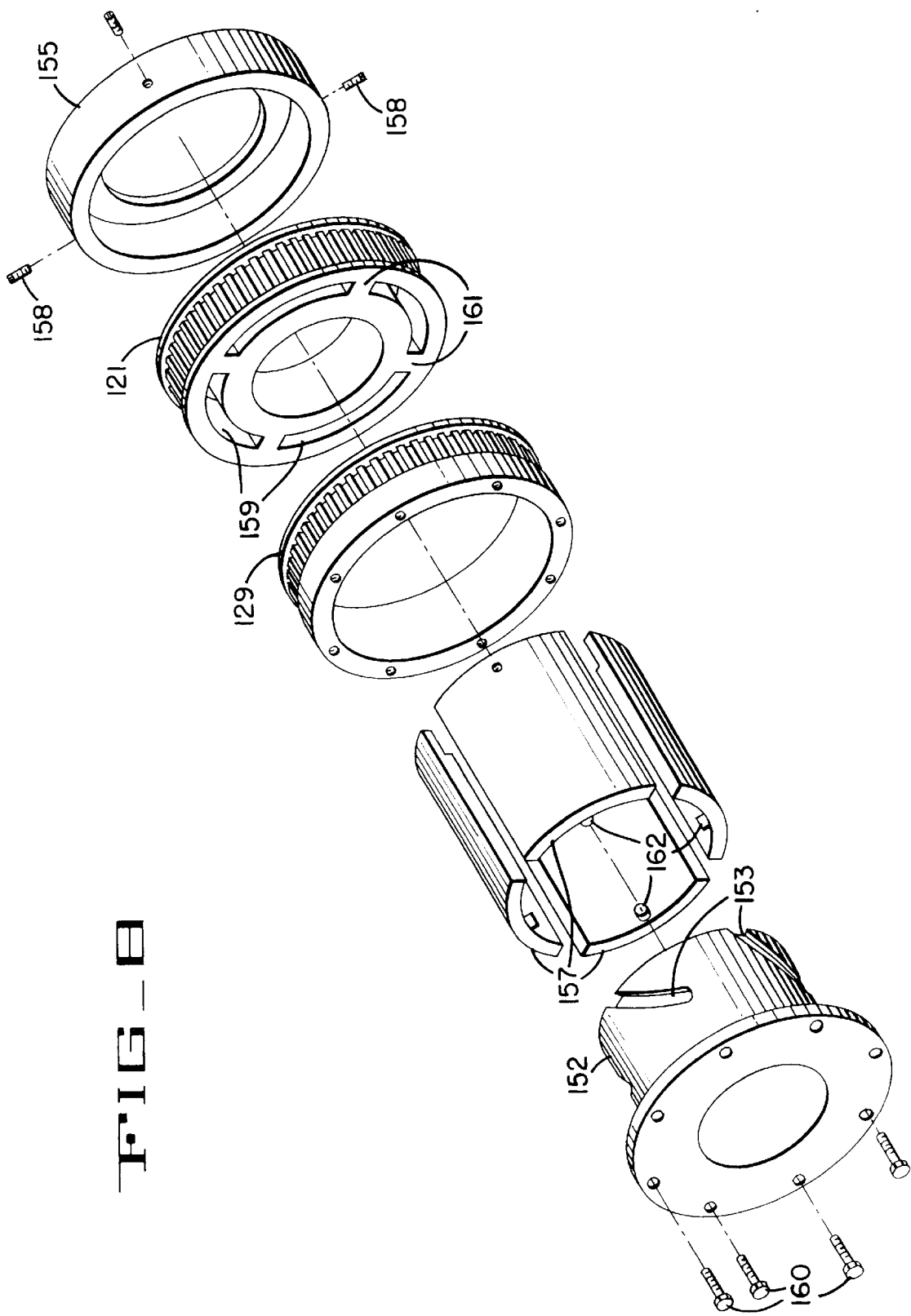

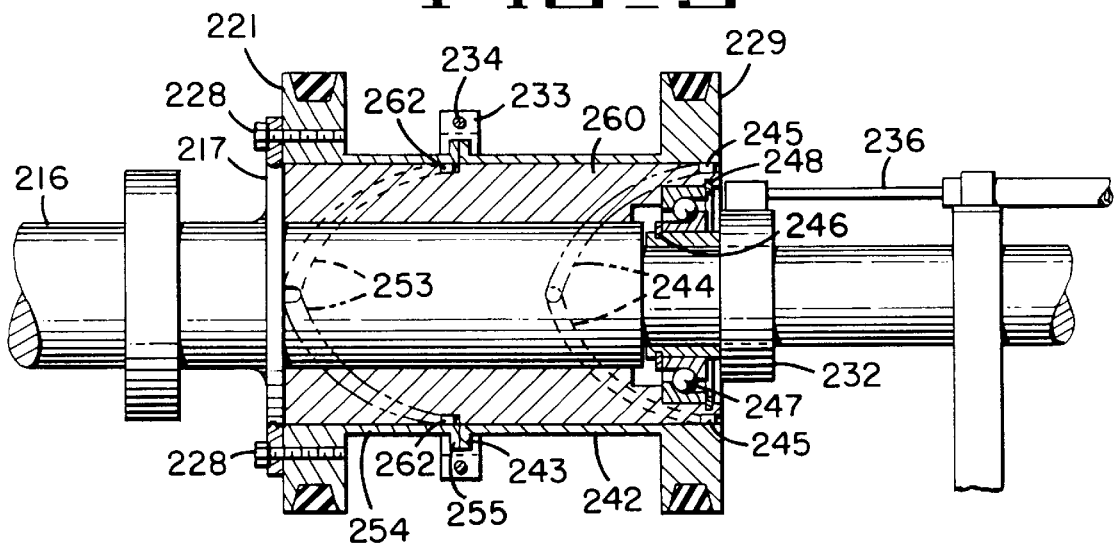
FIG_9
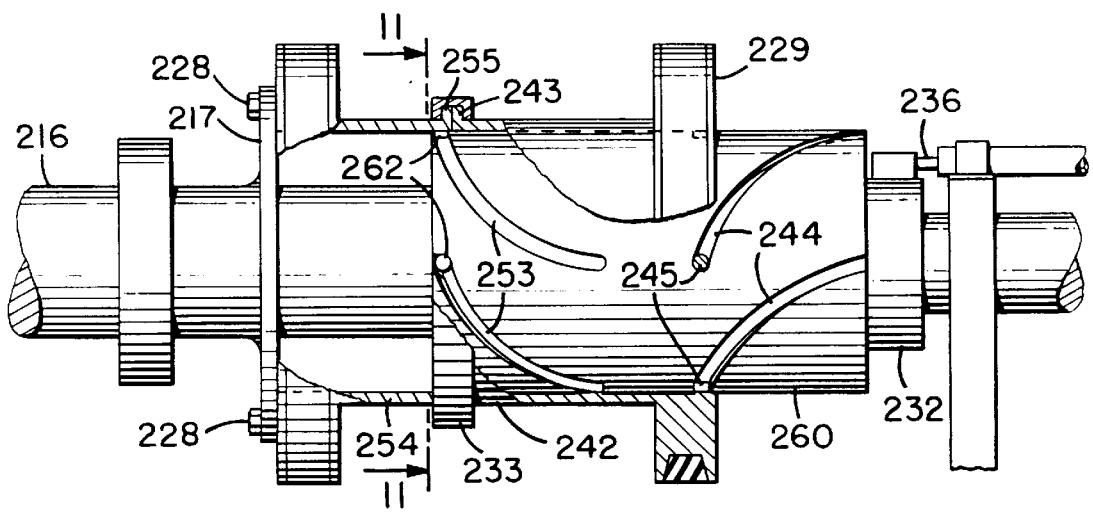
FIG_10
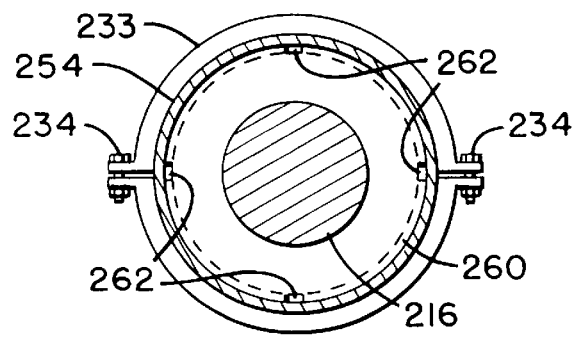
FIG_11

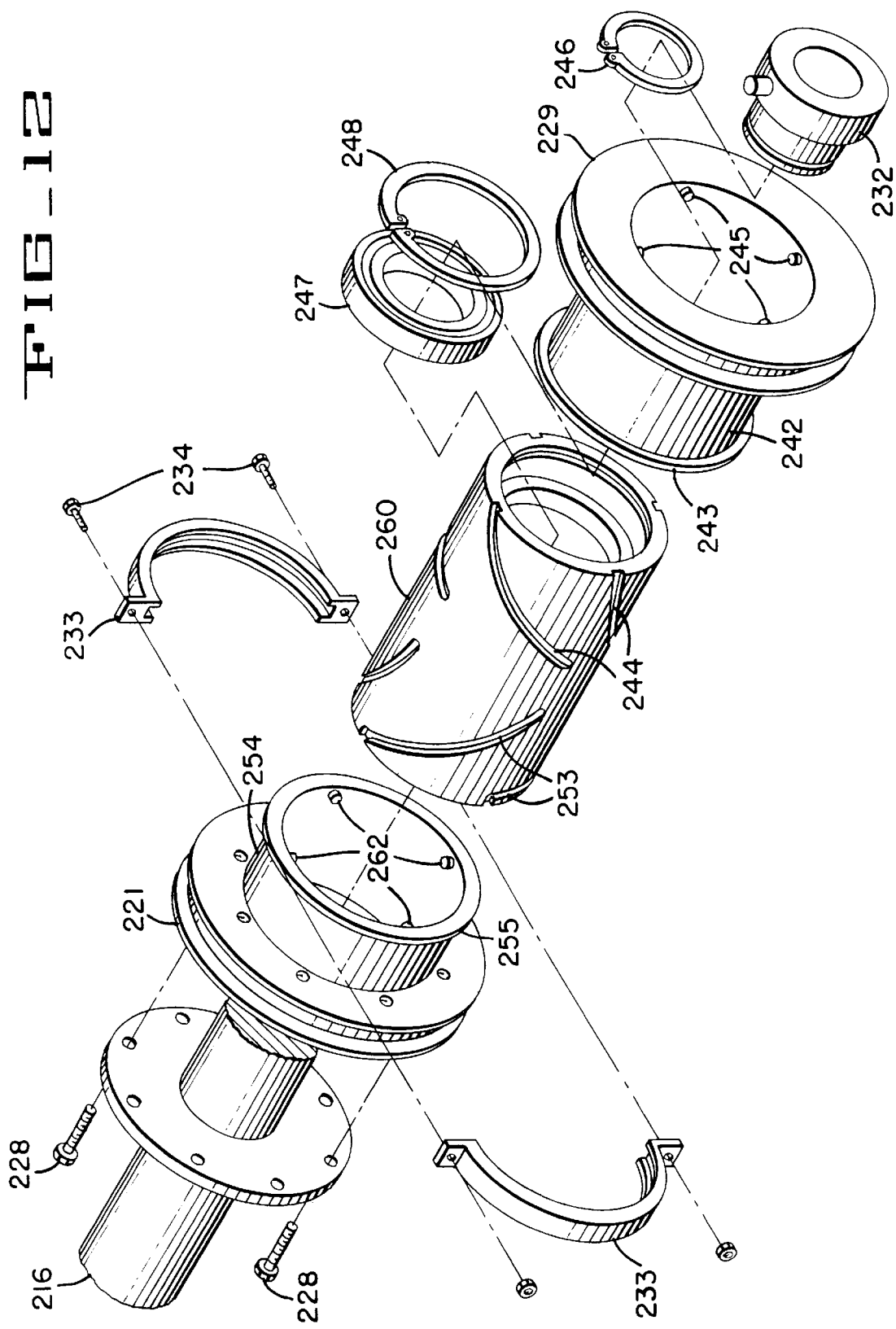

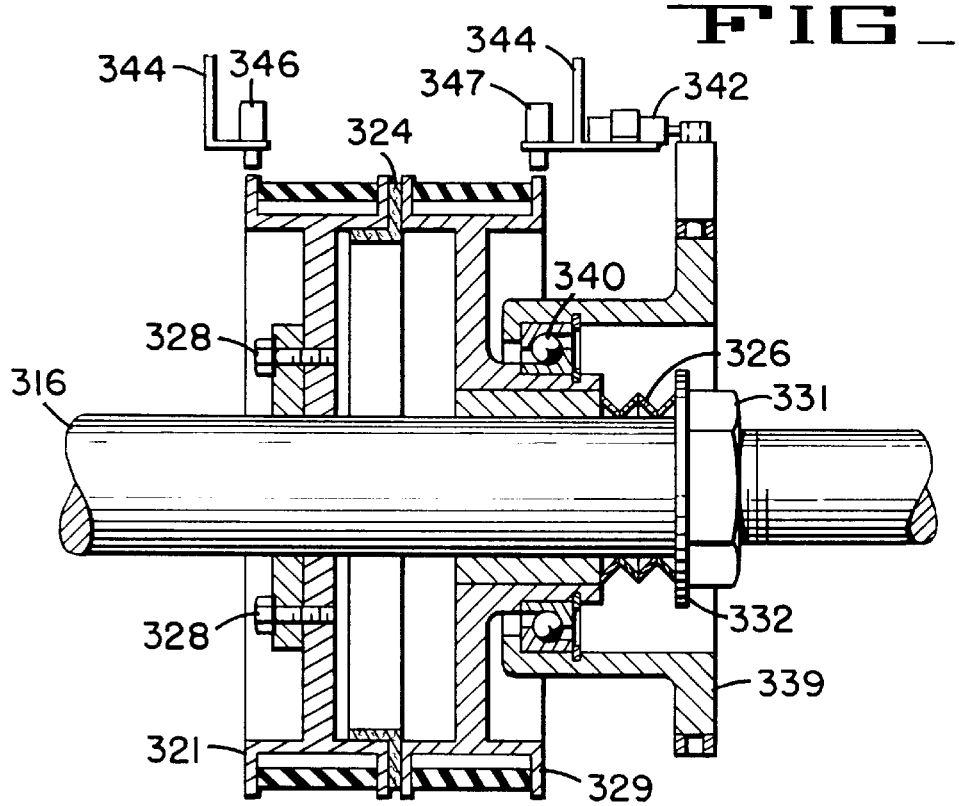
FIG_13
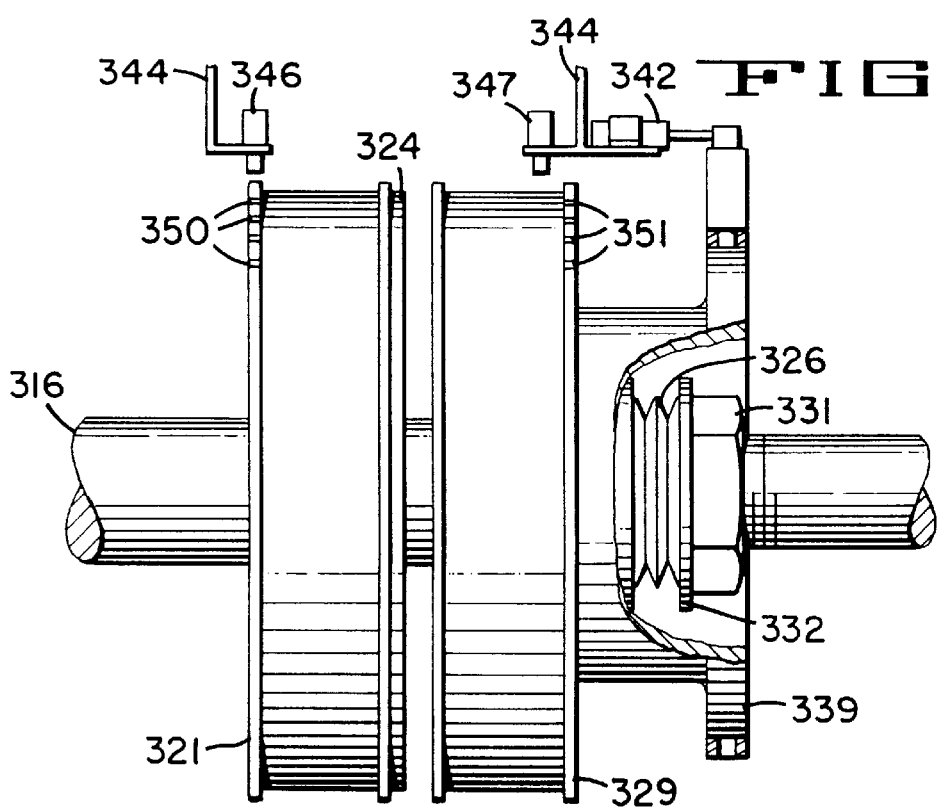
FIG_14

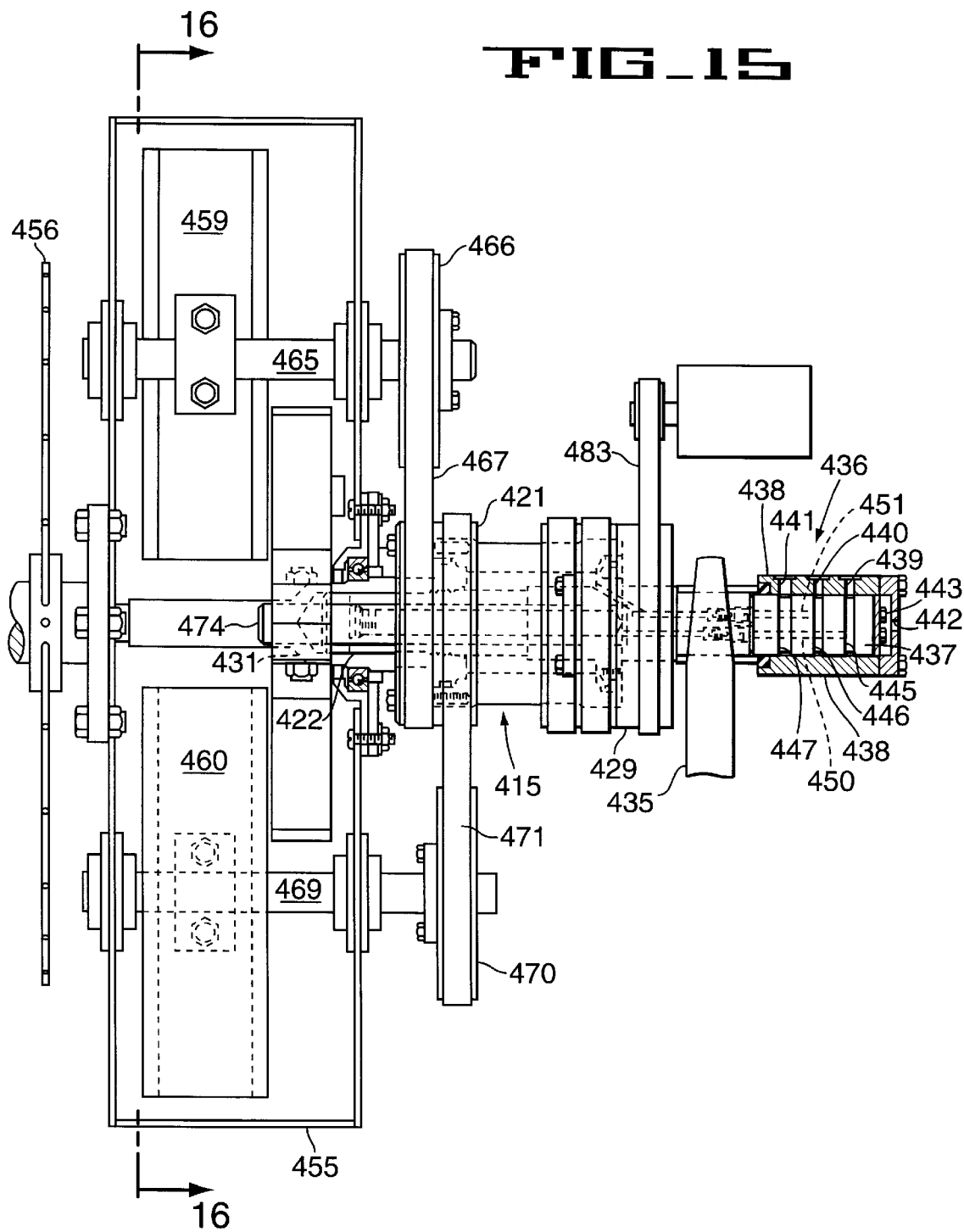

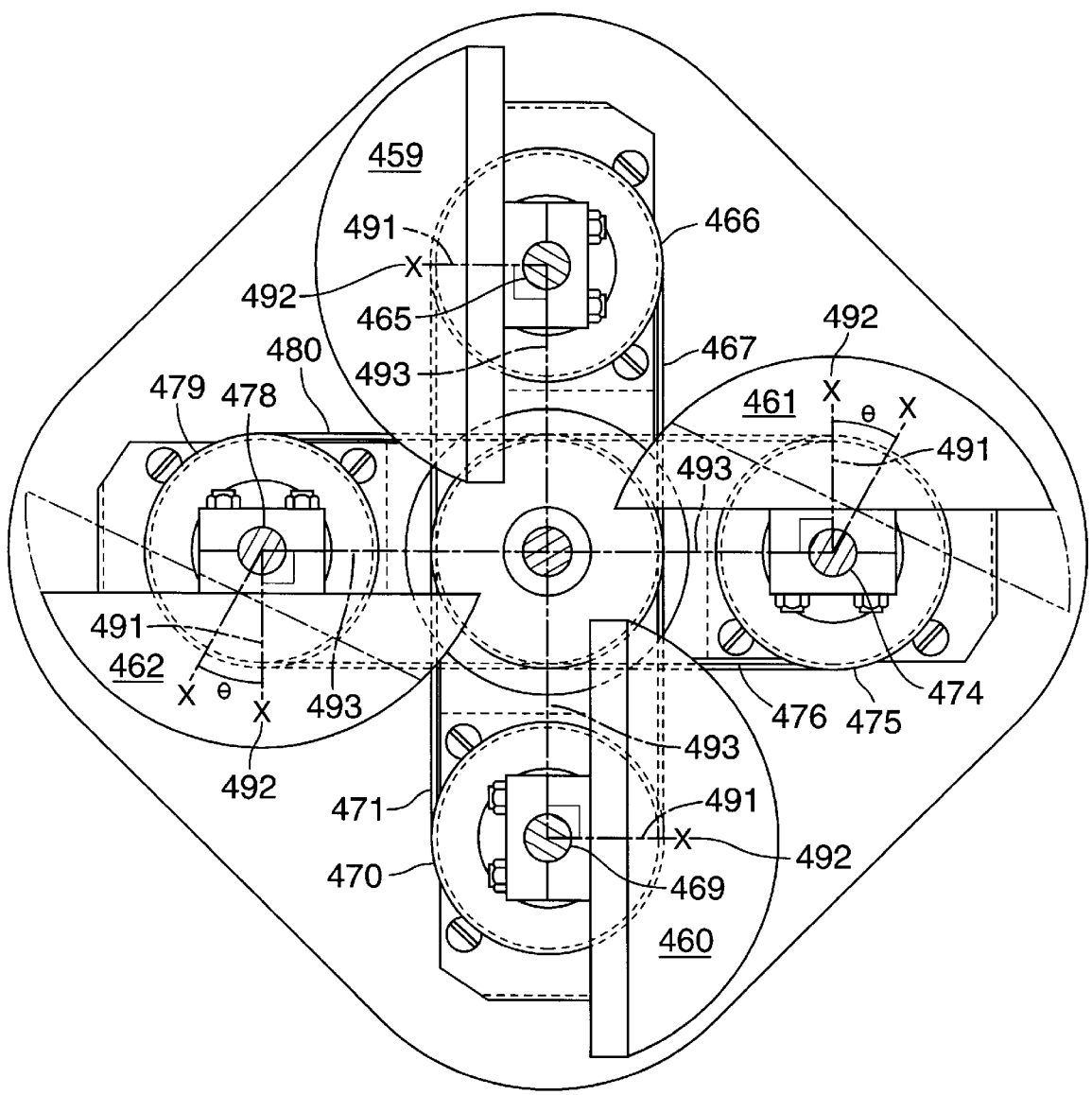
FIG_16

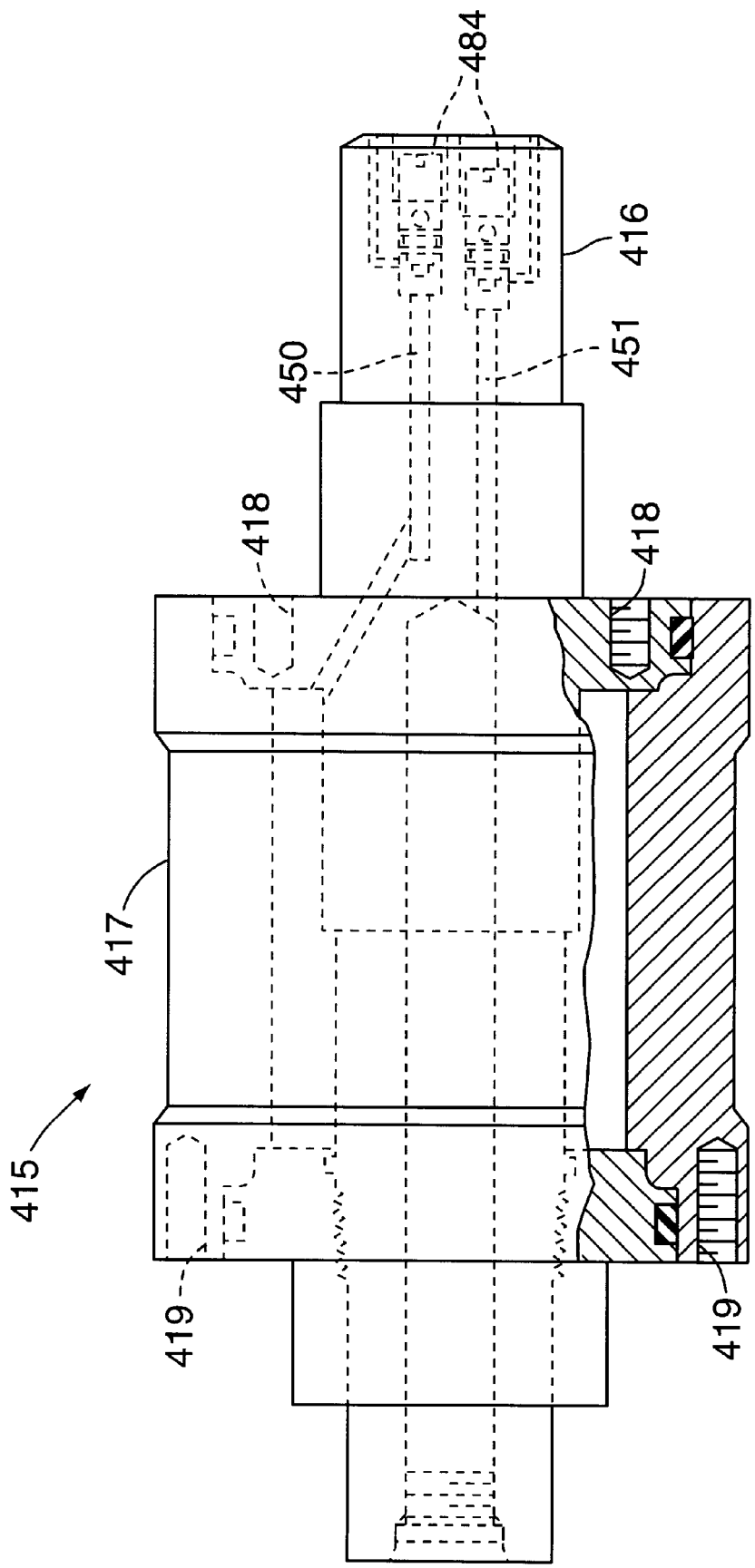
FIG_17

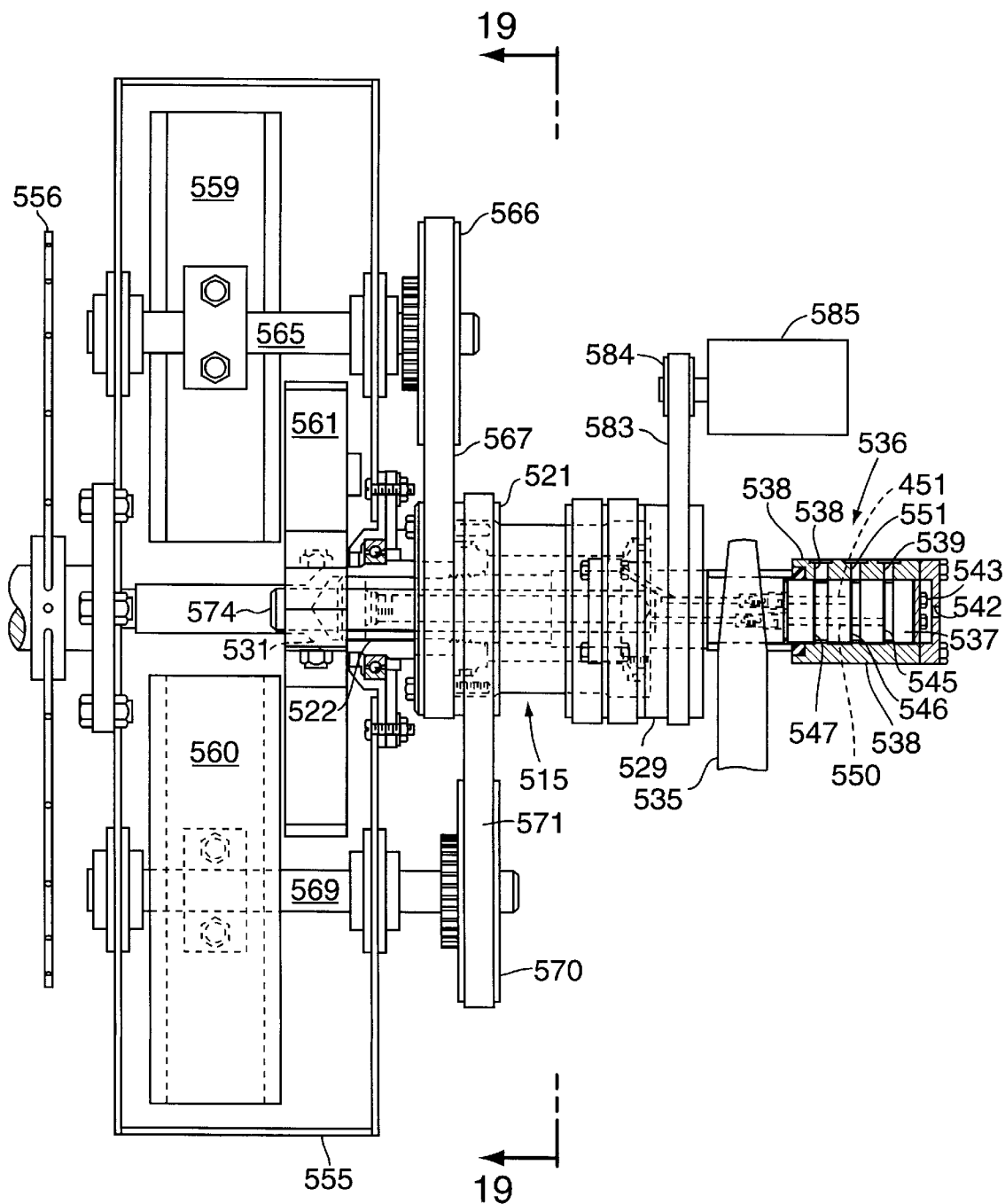
FIG_18

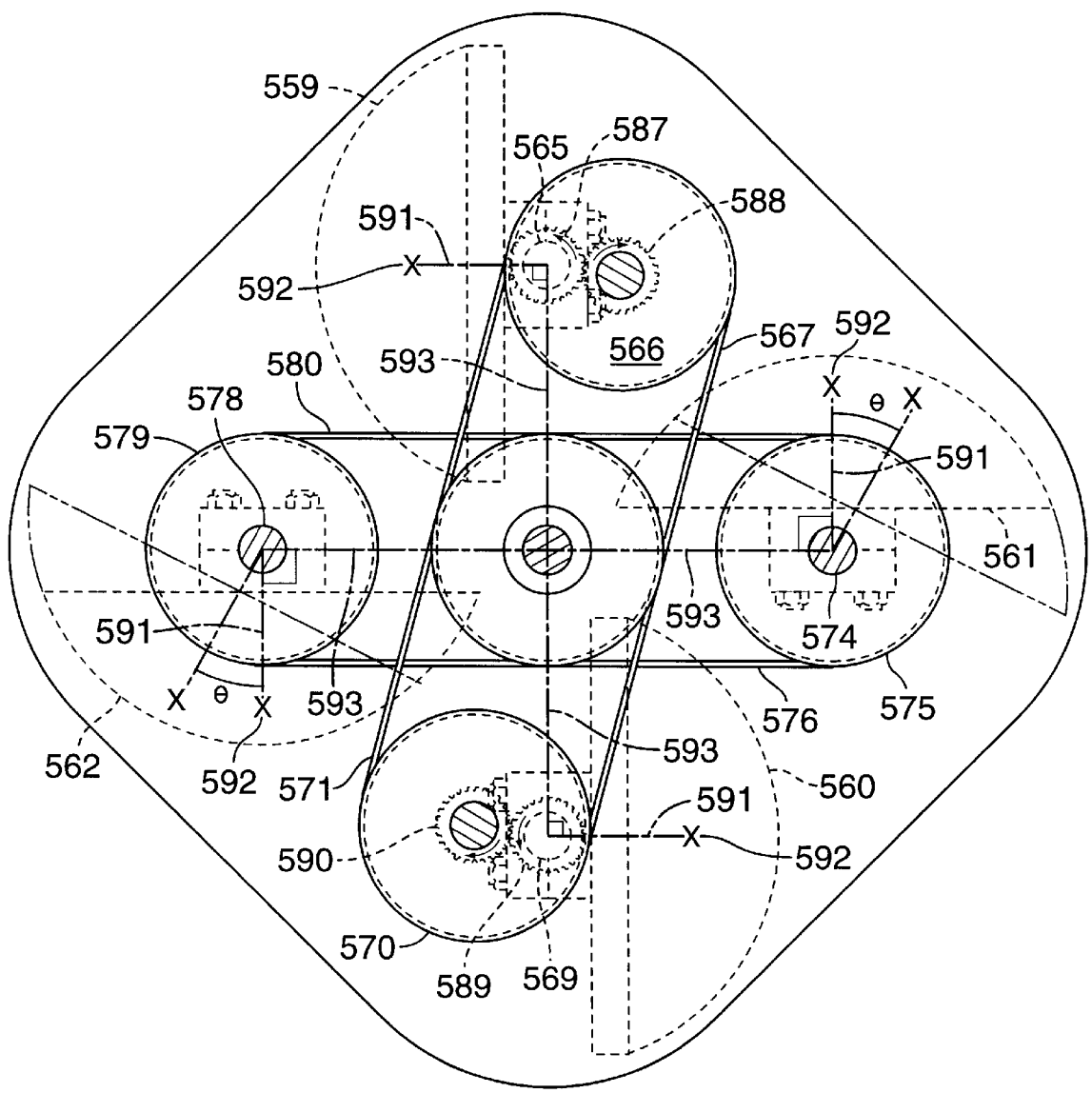
FIG_19

ADJUSTABLE FOUR-WEIGHT SHAKER HEAD

This application is a continuation-in-part of application Ser. No. 08/539,918, filed Oct. 6, 1995, now U.S. Pat. No. 5,685,773.

Forced balanced shakers are used in harvesters to provide an oscillation motion.

The present invention relates to a shaker head used in harvesters that uses four weights in an adjustable manner providing adjustable strokes.

FIG. 1 is a schematic view of a harvester which would use the inventive four weight shaker with a horizontal brush.

FIG. 2 is a cut away view of an embodiment of the inventive four weight shaker with a horizontal brush used in the harvester in FIG. 1.

FIG. 3 is a cut away view of the embodiment of the inventive shaker and part of the horizontal brush shown in FIG. 2.

FIG. 4 is an exploded view of part of the embodiment of the inventive shaker shown in FIG. 2.

FIG. 5 is a view of another harvester with another embodiment of the inventive four weight shaker with a vertical brush.

FIG. 6 is a cut away view of an embodiment of the inventive four weight shaker with a vertical brush used in the harvester in FIG. 5.

FIG. 7 is a cross sectional view of the embodiment of the inventive shaker shown in FIG. 6, along lines 7—7.

FIG. 8 is an exploded view of part of the embodiment of the inventive shaker shown in FIG. 6.

FIG. 9 is a cross sectional view of the pulleys of another embodiment of the invention.

FIG. 10 is cut away and cross-sectional view of the pulleys of the embodiment in FIG. 9, in a shifted position.

FIG. 11 is a cross-sectional view of FIG. 10 along lines 11.

FIG. 12 is an exploded view of the embodiment in FIG. 9.

FIG. 13 is a cross sectional view of pulleys and a phasing means of another embodiment of the invention.

FIG. 14 is a cut away view of the embodiment shown if FIG. 13.

FIG. 15 is a cross sectional view of the pulleys and means for phasing of another embodiment of the invention.

FIG. 16 is a cross sectional view of the embodiment shown in FIG. 15 along lines 16—16.

FIG. 17 is a cut away view of a rotary actuator used in the embodiment of the invention shown in FIG. 15.

FIG. 18 is a cross-sectional view of the pulleys and means for phasing of another embodiment of the invention.

FIG. 19 is a cross sectional view of the embodiment shown in FIG. 18 along lines 19—19.

DESCRIPTION OF THE PREFERRED EMBODIMENT

In the harvester 10 schematically shown in FIG. 1, a shaker mechanism 12 drives a horizontal brush 14. In this embodiment, the shaker mechanism 12 provides a rotation motion and an angular oscillation to the brush 14. One example of a harvester that uses a horizontal brush is described in U.S. Pat. No. 5,197,269 incorporated by reference.

FIG. 2 is a cut away view of an embodiment of the inventive four weight shaker with a horizontal brush used in the harvester in FIG. 1. FIG. 3 is a cut away view of the embodiment of the inventive shaker and part of the horizontal brush shown in FIG. 2. A shaft 16 is journaled between a first end mount 18 at a first end of the shaft 16 and a second end mount 20 at a second end of the shaft 16. A first drive pulley 21 is mounted around the shaft 16 and is keyed to the shaft 16, so that the shaft 16 rotates with the first drive pulley 21. A first shaft pulley 22 surrounds the shaft 16 and is also keyed to the shaft 16 so that it rotates with the shaft 16. An outer tube 25 surrounds the shaft 16 and slides freely around the shaft 16 so that the outer tube 25 rotates independently of the rotation of the shaft 16.

A first shaker housing 26 is mounted around the shaft 16 between the first shaft pulley 22 and the outer tube 25. The first shaker housing 26 rotates independently of the shaft 16, and is bolted to the outer tube 25 by bolts 28 so that the first shaker housing 26 rotates with the outer tube 25. A second drive pulley 29 surrounds the shaft 16 and is connected to the first shaker housing 26 and the outer tube 25 so that the second drive pulley 29 rotates with the first shaker housing 26 and the outer tube 25. Within the first shaker housing 26 is a first eccentric weight 30 and a second eccentric weight 31. The first eccentric weight 30 is keyed to a first eccentric weight shaft 33 which is keyed to a first eccentric weight pulley 34, so that the first eccentric weight 30, the first eccentric weight shaft 33 and the first eccentric weight pulley 34 all rotate together. A first endless belt 38 surrounds the first shaft pulley 22 and the first eccentric weight pulley 34. The second eccentric weight 31 is keyed to a second eccentric weight shaft 35 which is keyed to a second eccentric weight pulley 36, so that the second eccentric weight 31, the second eccentric weight shaft 35 and the second eccentric weight pulley 36 all rotate together. A second endless belt 39 surrounds the first shaft pulley 22 and the second eccentric weight pulley 36.

A second shaker housing 41 is mounted around the shaft 16 on the side of the outer tube 25 closest to the second end of the shaft 16. The second shaker housing 41 rotates independently of the shaft 16, and is bolted to the outer tube 25 by bolts 42 so that the second shaker housing 41 rotates with the outer tube 25. Within the second shaker housing 41 is a third eccentric weight 44 and a fourth eccentric weight 45. The third eccentric weight 44 is keyed to a third eccentric weight shaft 46 which is keyed to a third eccentric weight pulley 47, so that the third eccentric weight 44, the third eccentric weight shaft 46 and the third eccentric weight pulley 47 all rotate together. The fourth eccentric weight 45 is keyed to a fourth eccentric weight shaft 48 which is keyed to a fourth eccentric weight pulley 49, so that the fourth eccentric weight 45, the fourth eccentric weight shaft 48 and the fourth eccentric weight pulley 49 all rotate together.

A straight spline 51, which is formed by a long gear is keyed to the shaft 16 near the second end of the shaft 16, so that the straight spline 51 rotates with the shaft 16. A sliding tube 52 surrounds the straight spline 51 and is shaped so that the sliding tube 52 rotates with the straight spline 51. The sliding tube 52 is able to slide along the shaft 16 with respect to the shaft 16 and the straight spline 51. The sliding tube 52 has spiral grooves 53 on the outside of the sliding tube 52. A pulley tube 54 surrounds the sliding tube 52 and rotates independently of the sliding tube, and does not move longitudinally along the shaft 16 when the sliding tube 52 moves longitudinally. A ring 55 is bolted to the second shaker housing 41 so that the ring 55 rotates with the second shaker housing 41. A pulley tube bearing 56 is placed between the ring 55 and the pulley tube 54. The pulley tube bearing 56 helps to keep the pulley tube 54 from sliding along the shaft 16. A second shaft pulley 59 is integrated with the pulley tube 54. A plurality of pegs 62 pass through the pulley tube 54 and second shaft pulley 59 with an end of the pegs 62 fitting into the spiral grooves 53. A third endless belt 64 surrounds the second shaft pulley 59 and the third eccentric weight pulley 47. A fourth endless belt 65 surrounds the second shaft pulley 59 and the fourth eccentric weight pulley 49.

A hydraulic cylinder 67 is mounted to the frame 11 of the harvester 10. The hydraulic cylinder 67 is mechanically connected to a hydraulic cylinder shaft 68. The hydraulic cylinder shaft 68 is mechanically connected to the second end mount 20. The second end mount 20 allows the shaft 16 to rotate with respect to the second end mount 20 and slide with respect to the second end mount 20. The second end mount 20 is connected to the sliding tube 52 by a sliding tube bearing 69. The sliding tube bearing 69 allows the sliding tube 54 to rotate with respect to the end mount 20, but allows the end mount 20 to push and pull the sliding tube 54 along the shaft 16. A phase controller 85 controls the hydraulic cylinder 67.

On the outside of the outer tube 25 are a plurality of tines 71 forming a brush 14. A first hydraulic motor 73 is keyed to a first hydraulic motor shaft 74, which is keyed to a first hydraulic motor pulley 75. A first endless motor belt 76 surrounds the first hydraulic motor pulley 75 and the first drive pulley 21. A second hydraulic motor 78 is keyed to a second hydraulic motor shaft 79, which is keyed to a second hydraulic motor pulley 80. A second endless motor belt 81 surrounds the second hydraulic motor pulley 80 and the second drive pulley 29.

In operation, the second hydraulic motor 78 drives the second hydraulic motor shaft 79, which drives the second hydraulic motor pulley 80. The second hydraulic motor pulley 80 drives the second endless motor belt 81, which drives the second drive pulley 29, and causing the second drive pulley 29 to rotate. The rotation of the second drive pulley 29, causes the rotation of the first shaker housing 26, the brush 14, and the second shaker housing 41.

The first hydraulic motor 73 drives the first hydraulic motor shaft 74, which drives the first hydraulic motor pulley 75. The first hydraulic motor pulley 75 drives the first endless motor belt 76, which drives the first drive pulley 21, and causing the first drive pulley 21 to rotate. The rotation of the first drive pulley 21 causes the rotation of the shaft 16, which causes the rotation of the first shaft pulley 22.

The first shaft pulley 22 drives the first endless belt 38 and the second endless belt 39. The first endless belt 38 drives the first eccentric weight pulley 34, which drives the first eccentric weight shaft 33, which rotates the first eccentric weight 30. The second endless belt 39 drives the second eccentric weight pulley 36, which drives the second eccentric weight shaft 35, which rotates the second eccentric weight 31.

The shaft 16 also drives the straight spline 51, which causes the sliding tube 52 to rotate. The spiral grooves 53 in the rotating sliding tube 52 push on the pegs 62, which causes the pulley tube 54 and second shaft pulley 59 to rotate. The second shaft pulley 59 drives the third endless belt 64 and the fourth endless belt 65. The third endless belt 64 drives the third eccentric weight pulley 47, which drives the third eccentric weight shaft 46, which rotates the third eccentric weight 44. The fourth endless belt 65 drives the fourth eccentric weight pulley 49, which drives the fourth eccentric weight shaft 48, which rotates the fourth eccentric weight 45.

The phase controller 85 is set to change the phase between the eccentric weights. The phase controller 85 causes the hydraulic cylinder 67 to move the hydraulic cylinder shaft 68 along the shaft 16, which moves the second end mount 20 along the shaft 16. The second end mount 20 supports the second end of the shaft 16 and does not cause the shaft 16 to move along the shaft 16, but causes the sliding tube 52 to move along the shaft 16. Since the sliding tube 52 moves along the shaft 16 and the pulley tube 54 does not move along the shaft 16, sliding tube 52 slides along the shaft 16 with respect to the pulley tube 54. The pegs 62 in the spiral grooves 53 cause the pulley tube 54 to rotate with respect to the sliding tube 52 as the sliding tube 52 is moved along the shaft.

Initially the first, second, third, and fourth eccentric weights 30, 31, 44, 45 are all in phase. As the sliding tube 52 is moved along the shaft 16 by the hydraulic cylinder 67, the second shaft pulley 59 is rotated with respect to the shaft 16 and the first shaft pulley 22. This causes a phase change between the eccentric weights in the first shaker housing 26 and the weights in the second shaker housing 41. This allows an on the fly adjustment between the weights in the first shaker housing 26 and the second shaker housing 41, allowing for an on the fly adjustment of oscillation amplitude or variable amplitude oscillation. The first and second eccentric weights 30,31 may be a set of primary weights and therefore heavier than the third and fourth eccentric weights 44,45, which would be a set of secondary weights.

In this embodiment, the rotation of the brush 14 caused by the second hydraulic motor, causes plants to be moved with the brush 14. The angular oscillation of the brush 14 by the first hydraulic motor 73 causes fruit to be shaken from the plants. Some plants may be tomato plants or cucumber plants. The fruit would be tomatoes and cucumbers.

In this embodiment the shaker 12 and brush 14 are mounted on a frame 11 of the harvester 10 which is self propelled. Four wheels 13 are on the harvester 10.

In the specification and claims, a means for phasing is defined as a means for maintaining the set of primary eccentric weights and the set of secondary eccentric weights at the same angular speed (either in the same or opposite directions) with a phase angle between the primary eccentric weights and secondary eccentric weights, wherein the means for phasing is able to change the phase angle between the primary eccentric weights and the secondary eccentric weights while the primary eccentric weights and secondary eccentric weights are rotating. A more precise definition of phase angle will be provided below. In this embodiment, a means for phasing, comprises the shaft 16, the straight spline 51, the sliding tube 52 with spiral grooves 53, the pulley tube 54, pegs 62, the hydraulic cylinder 67, and the hydraulic cylinder shaft 68. The means for phasing is mechanically connected between the first shaft pulley 22 and the second shaft pulley 59, and provides a means for keeping the first shaft pulley 22 and second shaft pulley 59 at relative angular speeds so that the set of primary eccentric weights and the set of secondary eccentric weights are rotated at the same angular speed. The pegs 62 act as followers in the spiral grooves 53, with the hydraulic cylinder 67 being a powered pusher means for pushing the pegs 62 along the spiral grooves 53.

FIG. 5 shows another harvester 110 with a another embodiment of the invention, using a vertical brush 114. In the harvester 110 schematically shown in FIG. 5, a shaker mechanism 112 drives a vertical brush 114. In this embodiment, the shaker mechanism 112 provides an angular oscillation to the brush 114. One example of a harvester that uses a vertical brush is described in U.S. Pat. No. 4,329,836 incorporated by reference.

FIG. 6 is a cut away view of an embodiment of the inventive four weight shaker with a vertical brush 114 used in the harvester in FIG. 5. FIG. 7 is a cross sectional view of the embodiment of the inventive shaker shown in FIG. 6, along lines 7—7. A shaft 116 is journaled between a first end mount 118 at a first end of the shaft 116 and a second end mount 120 at a second end of the shaft 116. A first shaft pulley 121 is mounted around the shaft 116 with a first shaft pulley bearing 123 allowing the first shaft pulley 121 to rotate independently of the shaft 116. An outer tube 125 surrounds the shaft 116 and slides freely around the shaft 116 so that the outer tube 125 rotates independently of the rotation of the shaft 116.

A shaker housing 126 is mounted around the shaft 116 between the first pulley 121 and the outer tube 125. The shaker housing 126 is mounted around a shaker housing bearing 127 so that the shaker housing 126 rotates independently of the shaft 116, and is bolted to the outer tube 125 by bolts 128 so that the shaker housing 126 rotates with the outer tube 125. A second shaft pulley 129 surrounds the shaft 116 between the first shaft pulley 121 and the shaker housing 126. A second shaft pulley bearing 132 is placed between the second shaft pulley 129 and the shaft 116 to allow the second shaft pulley 129 to rotate independently of the shaft 116. Within the shaker housing 126 is a first eccentric weight 130, a second eccentric weight 131, a third eccentric weight 144, and a fourth eccentric weight 145. The first eccentric weight 130 is keyed to a first eccentric weight shaft 133 which is keyed to a first eccentric weight pulley 134. so that the first eccentric weight 130, the first eccentric weight shaft 133 and the first eccentric weight pulley 134 all rotate together. A first endless belt 138 surrounds the first shaft pulley 121 and the first eccentric weight pulley 134. The second eccentric weight 131 is keyed to a second eccentric weight shaft 135 which is keyed to a second eccentric weight pulley 136. so that the second eccentric weight 131, the second eccentric weight shaft 135 and the second eccentric weight pulley 136 all rotate together. A second endless belt 140 surrounds the first shaft pulley 121 and the second eccentric weight pulley 136. The third eccentric weight 144 is keyed to a third eccentric weight shaft 146 which is keyed to a third eccentric weight pulley 147. so that the third eccentric weight 144, the third eccentric weight shaft 146 and the third eccentric weight pulley 147 all rotate together. The fourth eccentric weight 145 is keyed to a fourth eccentric weight shaft 148 which is keyed to a fourth eccentric weight pulley 149. so that the fourth eccentric weight 145, the fourth eccentric weight shaft 148 and the fourth eccentric weight pulley 149 all rotate together. A third endless belt 164 surrounds the second shaft pulley 129 and the third eccentric weight pulley 147. A fourth endless belt 165 surrounds the second shaft pulley 129 and the fourth eccentric weight pulley 149.

A hydraulic cylinder 167 is mounted around the shaft 116 between the first shaft pulley 121 and the first end mount 118. The hydraulic cylinder 167 has a hydraulic fluid entry and exit tube 183. The hydraulic cylinder 167 comprises an outer covering 168, which has a first fluid seal 184 and a second fluid seal 185 against the shaft 116 to prevent fluid from leaking around the shaft 116, and yet allows the outer covering 168 to slide along the shaft 116. Within the outer cover 168 is a cylinder piston 186, which is in fluid tight connection with both the outer covering 168 and the shaft 116, but which is able to slide with respect to the outer covering 168. The cylinder piston 186 is secured to the shaft 116, so that the piston 186 does not slide along the shaft 116. A ring 155 is mounted around the outer covering 168 by a ring bearing 156, which allows the ring 155 to rotate independently of the outer covering 168, and yet causes the ring 155 to slide along the shaft 116 with the outer covering 168.

Four curved plates 157, which form sections of a single cylinder have first ends of the curved plates 157 fitting into the ring 155 and held to the ring 155 by screws 158. The curved plates 157 pass through slots 159 in the first shaft pulley 121, and through a central hole in the second shaft pulley 129. Walls 161 separate the slots 159 in the first shaft pulley 121 A grooved tube 152 surrounds the second shaft pulley bearing 132 and is bolted to the second shaft pulley 129 by grooved tube bolts 160, so that the grooved tube 152 rotates with the second shaft pulley 129 and independently of the shaft 16. Four spiral grooves 153 are cut in the grooved tube 152. Pegs 162 at second ends of the curved plates 157 fit into the spiral grooves 153 of the grooved tube 152. In this embodiment, more than one peg 162 could be placed on each curved plate 157, also requiring more spiral grooves 153. Only one peg 162 is shown per curved plate 157 to simplify the illustration.

On the outside of the outer tube 125 are a plurality of tines 171 forming a brush 114. A hydraulic motor 173 is keyed to a hydraulic motor shaft 174, which is keyed to a hydraulic motor pulley 175. An endless motor belt 176 surrounds the hydraulic motor pulley 175 and the first shaft pulley 121.

The first and second eccentric weights 130, 131 form a set of primary eccentric weights. The third and fourth eccentric weights 144, 145 form a set of eccentric weights.

In operation, the hydraulic motor 173 drives the hydraulic motor shaft 174, which drives the hydraulic motor pulley 175. The hydraulic motor pulley 175 drives the endless motor belt 176, which drives the first shaft pulley 121, and causing the first shaft pulley 121 to rotate. The rotation of the first shaft pulley 121 drives the first endless belt 138 and the second endless belt 140. The first endless belt 138 drives the first eccentric weight pulley 134, which drives the first eccentric weight shaft 133, which rotates the first eccentric weight 130. The second endless belt 140 drives the second eccentric weight pulley 136, which drives the second eccentric weight shaft 135, which rotates the second eccentric weight 131.

The first shaft pulley 121 also drives the curved plates 157, which pass through the slots 159 in the first shaft pulley 121, with the walls 161 pushing against the curved plates 157. The pegs 162 on the second end of the curved plates 157 push against the sides of the spiral grooves 153 causing the grooved tube 152 to rotate. The rotation of the grooved tube 152 causes the second shaft pulley 129 to rotate The second shaft pulley 129 drives the third endless belt 164 and the fourth endless belt 165. The third endless belt 164 drives the third eccentric weight pulley 147, which drives the third eccentric weight shaft 146, which rotates the third eccentric weight 144. The fourth endless belt 165 drives the fourth eccentric weight pulley 149, which drives the fourth eccentric weight shaft 148, which rotates the fourth eccentric weight 145.

The hydraulic cylinder 167 moves the outer covering 168 along the shaft 116, which moves the ring 155 along the shaft 116. The movement of the ring 155 along the shaft 116 causes movement of the curved plates 157 along the shaft 116. Since the curved plates 157 moves along the shaft 116 and the grooved tube 152 does not move along the shaft 116, the pegs 162 in the spiral grooves 153 cause the curved plates 157 to rotate with respect to the grooved tube 152 as the curved plates 157 are moved along the shaft 116. Since the grooved tube 152 is secured to the second shaft pulley 129 and the curved plates 157 are driven by the first shaft pulley 121, a phase rotation between the grooved tube 152 and the curved plates 157 causes a phase rotation between the first shaft pulley 121 and the second shaft pulley 129.

Initially the first, second, third, and fourth eccentric weights 130, 131, 144, 145 are all in phase. As the curved plates 157 are moved along the shaft 116 by the outer covering 168, the second shaft pulley 129 is rotated with respect to the first shaft pulley 121. This causes a phase change between the set of primary eccentric weights 130, 131 and the set of secondary eccentric weights 144, 145. This allows an on the fly adjustment between the set of primary eccentric weights 130, 131 and the set of secondary eccentric weights 144, 145, allowing for an on the fly adjustment of oscillation amplitude or variable amplitude oscillation.

In this embodiment, the brush 114 may be placed against plants such as fruit trees, nut trees or grape vines. The angular oscillation of the tines 117 causes the fruit of the plants such as grapes or nuts to be removed from the plants.

In this embodiment the shaker 112 and brush 114 are mounted on a frame 111 of a pull behind harvester 110. The harvester 110 is mounted on two wheels 113, and the hydraulic power is provided by a tractor that pulls the harvester 110.

In this embodiment, a means for phasing, comprises the grooved tube 152 with spiral grooves 153, the ring 155, curved plates 157 with pegs 162, the hydraulic cylinder 167, slots 159, grooved tube bolts 160 and the outer covering 168. The means for phasing is mechanically connected between the first shaft pulley 121 and the second shaft pulley 129, and provides a means for keeping the first shaft pulley 121 and second shaft pulley 129 at relative angular speeds so that the set of primary eccentric weights and the set of secondary eccentric weights are rotated at the same angular speed and allows a change in the phase of rotation (relative angular position) between the set of primary eccentric weights and the set of secondary eccentric weights while the weights are rotating.

FIGS. 9–12 illustrate the pulleys and means for phasing in another embodiment of the invention. A shaft 216 with a flange 217 is mechanically connected to a first shaft pulley 221 by bolts 228. The first shaft pulley 221 is integrally formed with a first pulley tube 254, which has the first shaft pulley 254 on one end and a first pulley tube flange 255 on the other end. A grooved tube 260 passes through the center of the first pulley tube 254. Adjacent to the first pulley tube 254 the grooved tube 260 has a first plurality of spiral grooves 253, which spiral in a clockwise direction. A plurality of first pulley tube pegs 262 extend from the first pulley tube 254 into the first plurality of spiral grooves 253. A second pulley tube 242 has a second shaft pulley 229 at one end and a second pulley tube flange 243 at the other end. The grooved tube 260 passes through the center of the second pulley tube 242. Adjacent to the second pulley tube 242, the grooved tube 260 has a second plurality of spiral grooves 244, which spiral in a counter clockwise direction. A plurality of second pulley tube pegs 245 extend from the second pulley tube 242 into the second plurality of spiral grooves 244. The shaft 216 passes through the center of the grooved tube 260. A collar 232 also slips around the shaft on the side of the first pulley tube 254 and second pulley tube 242 away from the flange 217. An inner snap ring 246, a bearing 247 and outer snap ring 248 are used to connect the collar 232 to the grooved tube 260 allowing the grooved tube 260 to rotate independently of the collar 232. A flange clamp 233 secured by clamp bolts 234 surrounds the first pulley tube flange 255 and the second pulley tube flange 243, keeping the first pulley tube flange 255 adjacent to the second pulley tube flange 243, but allowing them to rotate independently. A push and pull rod 236 is attached to the collar 232 and is able to move the collar 232 along the shaft 216.

In operation, the push rod 236 may be fully extended as shown in FIG. 9, when the shaft 216 is driven. The first pulley tube pegs 262 and the second pulley tube pegs 245 are to the right part of the first spiral grooves 253 and the second spiral grooves 244 as viewed in FIG. 9. The shaft 216 drives the first shaft pulley 221 through the flange 217. The first shaft pulley 221 drives the first pulley tube 254, which drives the plurality of first pulley tube pegs 262, which drives the grooved tube 260, by pushing on the first plurality of spiral grooves 253. The second plurality of spiral grooves drives the second pulley tube pegs 245, which drive the second pulley tube 242, which drives the second shaft pulley 229.

The push and pull rod 236 then retracts, pulling the collar 232 to the right as viewed in FIG. 10. The movement of the collar 232 to the right along the shaft 216, causes the grooved tube 260 to move to the right along the shaft 216, while the first pulley tube 254 and the second pulley tube 242 do not move along the shaft 216. This relative movement between the grooved tube 260 and the first pulley tube 254 and the second pulley tube 242 causes the first pulley tube pegs 262 and the second pulley tube pegs 245 to move to the left part of the first spiral grooves 253 and the second spiral grooves 244 as shown in FIG. 10. The movement of the first pulley tube pegs 262 from the right side of the first spiral grooves 253 to the left side of the first spiral grooves 253 causes the first pulley tube 254 to move clockwise with respect to the grooved tube 260. The movement of the second pulley tube pegs 245 from the right side of the second spiral grooves 244 to the left side of the second spiral grooves 244 causes the second pulley tube 242 to move counter-clockwise with respect to the grooved tube 260. Since the first pulley tube 254 moves in the opposite direction as the second pulley tube 242 as the grooved tube 260 is moved to the right, causes a change in the relative angular position of the first pulley tube 254 and the second pulley tube 242, which causes a change in the relative angular position of the first shaft pulley 221 and the second shaft pulley 229.

In this embodiment, a means for phasing, comprises the grooved tube 260 with first spiral grooves 253 and second spiral grooves 244, the collar 232, the push and pull rod 236, the first pulley tube pegs 262, and the second pulley tube pegs 245. The means for phasing is mechanically connected between the first shaft pulley 221 and the second shaft pulley 229. The means for phasing in this embodiment may replace the means for phasing, the first shaft pulley, the second shaft pulley and the shaft in the embodiment shown in FIGS. 5 to 8.

FIGS. 13 and 14 illustrate the pulleys and means for phasing in another embodiment of the invention. FIGS. 13 and 14 show a first shaft pulley 321 and a second shaft pulley 329 mounted on a shaft 316. The first shaft pulley 321 is bolted to the shaft 316 by bolts 328, so that the first shaft pulley 321 rotates with the shaft 316. A clutch face 324 is mechanically connected to a side of the first shaft pulley 321 between the first shaft pulley 321 and the second shaft pulley 329, so that the clutch face 324 rotates with the first shaft pulley 321. The second shaft pulley 329 is able to rotate independently of the shaft 316. A nut 331 and collar 332 are placed on the shaft 316. Belville washer springs 326 are placed between the collar 332 and the second shaft pulley 329 to apply a force on the second shaft pulley 329 towards the clutch face 324. A throw out piece 339 is connected to the second shaft pulley 329 by a bearing 340 so that the throw out piece 339 rotates independently of the second shaft pulley 329. A hydraulic cylinder 342 is connected between the throw out piece 339 and the frame 344 of the harvester. A first sensor 346 is placed adjacent to the first shaft pulley 321 and mounted on the frame 344 so that the first sensor 346 senses markings 350 on the first shaft pulley 321. A second sensor 347 is placed adjacent to the second shaft pulley 329 and mounted on the frame 344 so that the second sensor 347 senses markings 351 on the second shaft pulley 329. The first sensor 346 and the second sensor 347 are electrically connected to a phase controller 85. The hydraulic cylinder 342 is in fluid connection with the phase controller 85.

In operation, the phase controller 85 is set for a desired phase angle between the first shaft pulley 321 and the second shaft pulley 329. The first sensor 346 senses the markings on the first shaft pulley 321. The second sensor 347 senses the markings on the second shaft pulley 329. The phase controller 85 uses the sensed markings to determines the actual phase angle between the first shaft pulley 321 and the second shaft pulley 329. If the desired phase angle is not equal to the actual phase angle, the phase controller 85 actuates the hydraulic cylinder 342, which pushes the throw out piece 339 away from the first shaft pulley 321. The throw out piece 339 pulls the second shaft pulley 329 from the first shaft pulley 321, the first shaft pulley 321 to rotate faster than the second shaft pulley 329, allowing a change in the actual phase angle between the first shaft pulley 321 and the second shaft pulley 329. The phase controller 85 then pulls the throw out piece 339 towards the first shaft pulley 321, which pushes the second shaft pulley 329 towards the first shaft pulley 321 pushing the second shaft pulley 329 against the clutch face 324. The matching surfaces of the clutch face 324 and the second shaft pulley 329 causes sufficient friction so that the second shaft pulley 329 spins as fast as the first shaft pulley 321, when the second shaft pulley 329 is against the clutch face. The phase controller 85 again senses the markings on the first shaft pulley 321 and the second shaft pulley 329 and measures the actual phase angle. If the actual phase angle is equal to the desired phase angle, the process is stopped. If the actual phase angle is not equal to the desired phase angle, the above process is again repeated until the actual phase angle is equal to the desired phase angle.

FIGS. 15 and 16 illustrate the pulleys and means for phasing in another embodiment of the invention. FIGS. 15 and 16 show a first shaft pulley 421 and a second shaft pulley 429. The means for phasing is provided by a rotary actuator 415, shown in more detail in FIG. 17, which is mechanically connected between the first shaft pulley 421 and the second shaft pulley 429. The rotary actuator 415 comprises an inner hub 416 surrounded by an outer housing 417. The inner hub 416 is mechanically connected to the second shaft pulley 429 by bolts placed in inner hub bolt holes 418. The inner hub 416 is also mechanically connected to a first shaft 422, which is pressed on to an end of the inner hub 416. The outer housing 417 is mechanically connected to the first shaft pulley 421 by bolts placed in outer housing bolt holes 419.

The first shaft 422 is supported by the inner hub 416 on a first end and a shaft yoke 431 on a second end. The inner hub 416 extends from the first shaft 422 through the outer housing 417, through the second shaft pulley 429, through a bearing in a support frame 435 to a rotary valve 436.

The rotary valve 436 comprises an inner cylinder 437 and an outer shell 438. The outer shell 438 has a plurality of hydraulic ports, in this embodiment a first port 439, a second port 440, a first drain port 441 and a second drain port 442, which pass through the outer shell 438. The outer shell 438 is allowed to free float with respect to the support frame 435, and is only kept from rotating by hydraulic hoses connected to the first port 439, the second port 440, and the first drain port 441. The inner cylinder 437 has a plurality of grooves, in this embodiment three, a first groove 445, a second groove 446 and a drain groove 447 to match the first port 439, second port 440, and first drain port 441. Bolts 443 are used to bolt the inner cylinder to the inner hub 416.

A first channel 450 passes from the first groove 445 through the inner cylinder 437 and through the inner hub 416. A second channel 451 passes from the second groove 446 through the inner cylinder 437, and through the inner hub 416.

A shaker housing 455 is mounted between the first shaft pulley 421 and a shaker brush 456. The shaker housing 455 rotates independently of the first shaft 422 about a housing axis which passes through the first shaft 422 and the inner hub 416. The shaker housing 455 is bolted to the shaker brush 456 so that the shaker brush 456 rotates with the shaker housing 455. Within the shaker housing 455 is a first eccentric weight 459, a second eccentric weight 460, a third eccentric weight 461 and a fourth eccentric weight 462. The first eccentric weight 459 is keyed to a first eccentric weight shaft 465 which is keyed to a first eccentric weight pulley 466, so that the first eccentric weight 459, the first eccentric weight shaft 465 and the first eccentric weight pulley 466 all rotate together. A first endless belt 467 surrounds the first shaft pulley 421 and the first eccentric weight pulley 466. The second eccentric weight 460 is keyed to a second eccentric weight shaft 469 which is keyed to a second eccentric weight pulley 470, so that the second eccentric weight 460, the second eccentric weight shaft 469 and the second eccentric weight pulley 470 all rotate together. A second endless belt 471 surrounds the first shaft pulley 421 and the second eccentric weight pulley 470. The third eccentric weight 461 is keyed to a third eccentric weight shaft 474 which is keyed to a third eccentric weight pulley 475, so that the third eccentric weight 461, the third eccentric weight shaft 474 and the third eccentric weight pulley 475 all rotate together. A third endless belt 476 surrounds the second shaft pulley 429 and the third eccentric weight pulley 475. The fourth eccentric weight 462 is keyed to a fourth eccentric weight shaft 478 which is keyed to a fourth eccentric weight pulley 479, so that the fourth eccentric weight 462, the fourth eccentric weight shaft 478 and the fourth eccentric weight pulley 479 all rotate together. A fourth endless belt 480 surrounds the second shaft pulley 429 and the fourth eccentric weight pulley 479.

The first eccentric weight 459 and the second eccentric weight 460 form a set of primary eccentric weights. The third eccentric weight 461 and the fourth eccentric weight 462 form a set of secondary eccentric weights. The first eccentric weight 459 and the second eccentric weight 460 forming the set of primary eccentric weights rotate in a different plane than the plane of rotation of the third eccentric weight 461 and the fourth eccentric weight 462, which form the set of secondary eccentric weights. Because the primary eccentric weights rotate in a different plane than the secondary eccentric weights, the weights can be placed closer to the first shaft 422 allowing for a smaller shaker housing 455 and a more compact system.

A drive belt 483 surrounds the second shaft pulley 429 and a drive pulley.

In operation, the set of primary eccentric weights (first and second eccentric weights 459, 460) may first be in phase with the set of secondary eccentric weights (third and fourth eccentric weights 461, 462). Being in phase means that lines 491 from the center of masses 492 of the first, second, third, and fourth eccentric weights 459, 460, 461, 462 to the axes of rotation of the first, second, third, and fourth eccentric weights 459, 460, 461, 462, respectively are all perpendicular to moment arms 493 extending from the axis of oscillation to the axes of rotation of the eccentric weights at the same time, as shown in FIG. 16.

The drive belt 483 drives the second shaft pulley 429, which drives the rotary actuator 415, which drives the first shaft pulley 421. When rotating, the set of primary and secondary eccentric weights cause a rotational oscillation about an axis of oscillation, which passes through the first shaft 422. The maximum oscillation force and amplitude is achieved when the set of primary and secondary eccentric weights are in phase.

The phase angle is defined as the angle that the lines between centers of mass of the secondary weights (third and fourth eccentric weights 461, 462) and the axes of rotation of the secondary weights is from being perpendicular to the moment arm extending from the axis of oscillation to the axes of rotation of the secondary weights, when the lines extending from the centers of mass of the primary weights (first and second eccentric weights 459, 460) to the axes of rotation of the primary weights are perpendicular to the moment arm extending from the axis of oscillation to the axes of rotation of the primary weights, so that when the set of primary and secondary eccentric weights are in phase, the phase angle is zero.

When a phase controller, as described in previous embodiments is set to change the phase angle to an angle q, hydraulic pressure is applied to the first port 439, which applies hydraulic pressure through the first groove 445 to the first channel 450. The hydraulic pressure in the first channel 450 causes fluid to pass into a chamber between the inner hub 416 and outer housing 417 of the rotary actuator 415 causing the inner hub 416 to rotate (in this example in a clockwise direction) with respect to the outer housing 417. This causes the first shaft pulley 421 to rotate (in this example in a clockwise direction) with respect to the second shaft pulley 429. This changes the phase angle between the set of primary eccentric weights and the set of secondary eccentric weights, causing the set of primary eccentric weights to be out of phase with the set of secondary eccentric weights. When the desired phase angle between the set of primary eccentric weights and secondary eccentric weights is achieved, the hydraulic pressure applied to the first port 439 is stopped. The phase angle q is shown with the secondary weights in phantom lines in FIG. 16. Since the set of primary eccentric weights are rotating out of phase with the set of secondary eccentric weights, the oscillation force created by the set of primary and secondary eccentric weights is reduced by a function of cosine q. Vented hydraulic fluid passes from the rotary actuator 415 through the second channel 451, through the second groove 446 to the second port 440, to a reservoir.

To reverse the phase change by applying hydraulic pressure to the first port 439, hydraulic pressure is applied to the second port 440, which applies hydraulic pressure through the second groove 446 to the second channel 451. The hydraulic pressure in the second channel 451 causes fluid to pass into a chamber between the inner hub 416 and outer housing 417 of the rotary actuator 415 causing the inner hub 416 to rotate (in this example in a counter-clockwise direction) with respect to the outer housing 417. This causes the first shaft pulley 421 to rotate (in this example in a counter-clockwise direction) with respect to the second shaft pulley 429. Vented hydraulic fluid passes from the rotary actuator 415 through the first channel 450, through the first groove 445 to the first port 439, and then to the reservoir. A four way valve or other conventional hydraulic means may be used to alternately connect the first port 439 to a pump and the second port 440 to the reservoir, or to connect the second port 440 to a pump and the first port 439 to the reservoir or to cap the first and second ports 439, 440.

The rotary valve 436 allows a hydraulic connection between a stationary hydraulic system and the rotating hydraulic actuator 415 without the use of high pressure seals. The drain groove 447 and the second drain port 442 collect high pressure leakage, which passes along the inner cylinder 437 surface from the first groove 445 and the second groove 446, and diverts the leakage to the reservoir. The high pressure leakage in the rotary valve 436 provides some of the lubrication of the rotary valve 436 and acts as a damper to help control on the fly phase change. An additional port, is dedicated to providing additional lubrication to the rotary valve 436. Pilot operated check valves 484 on the rotary actuator 415 are provided so that torque variations between the primary and secondary weight sets or leakage in the rotary valve 436 will not cause a phase shift. The floating outer shell 438, also helps keep the rotary valve 436 from binding.

As with the previous embodiments, this embodiment allows an on the fly change of the phase angle between the set of primary eccentric weights and the set of secondary eccentric weights as both sets of weights are rotated. The rotary actuators are known in the art. An example of a rotary actuator is described in U.S. Pat. No. 4,823,678. Various rotary actuators, with a housing that may be spun at a high speed may be used in place of the rotary actuator 415 used in this embodiment of the invention. An eccentricity of a weight is defined by the distance between the center of mass between the center of mass of the weight and the axis of rotation of the weight. In the preferred embodiment, the sum of the masses of the secondary weights times eccentricities of the secondary weights is less than the sum of the masses of the primary weights times the eccentricities of the primary weights. Since in this embodiment the eccentricities are about equal, the secondary weights have less mass than the mass of the primary weights. It is preferable that the sum of the masses of the secondary weights times the eccentricity of the secondary weights is not equal to the sum of the masses of the primary weights times the eccentricity of the primary weights., although allowing these sums to be equal is possible.

FIGS. 18 and 19 illustrate the pulleys and means for phasing in another embodiment of the invention. FIGS. 18 and 19 show a first shaft pulley 521 and a second shaft pulley 529. The means for phasing is provided by a rotary actuator 515, which may be the same rotary actuator 415 which is used in the previous embodiment and shown in more detail in FIG. 17, and which is mechanically connected between the first shaft pulley 521 and the second shaft pulley 529. The rotary actuator 515 comprises an inner hub 516 surrounded by an outer housing. The inner hub 516 is mechanically connected to the second shaft pulley 529 by bolts placed in inner hub bolt holes. The inner hub 516 is also mechanically connected to a first shaft 522, which is pressed on to an end of the inner hub. The outer housing is mechanically connected to the first shaft pulley 521 by bolts placed in outer housing.

The first shaft 522 is supported by the inner hub 516 on a first end and a shaft yoke 531 on a second end. The inner hub 516 extends from the first shaft 522 through the outer housing, through the second shaft pulley 529, through a bearing in a support frame 535 to a rotary valve 536.

The rotary valve 536 comprises an inner cylinder 537 and an outer shell 538. The outer shell 538 has a plurality of hydraulic ports, in this embodiment a first port 539, a second port 540, a first drain port 541, and a second drain port 542, which pass through the outer shell 538. The outer shell 538 is allowed to free float with respect to the support frame 535, and is only kept from rotating by hydraulic hoses connected to the first port 539, the second port 540, and the first drain port 541. The inner cylinder 537 has a plurality of grooves, in this embodiment three, a first groove 545, a second groove 546 and a drain groove 547 to match the first port 539, second port 540, and drain port 541, respectively. Bolts 553 are used to hold the inner cylinder 537 to the inner hub 516.

A first channel 550 passes from the first groove 545 through the inner cylinder 537, and through the inner hub 516. A second channel 551 passes from the second groove 546 through the inner cylinder 537, and through the inner hub 516.

A shaker housing 555 is mounted between the first shaft pulley 521 and a shaker brush 556. The shaker housing 555 rotates independently of the first shaft 522 about a housing axis which passes through the first shaft 522 and the inner hub 516. The shaker housing 555 is bolted to the shaker brush 556 so that the shaker brush 556 rotates with the shaker housing 555. Within the shaker housing 555 is a first eccentric weight 559, a second eccentric weight 560, a third eccentric weight 561 and a fourth eccentric weight 562. The first eccentric weight 559 is keyed to a first eccentric weight shaft 565 which is keyed to a first eccentric weight shaft gear 587, which is mated to a twin first eccentric weight drive gear 588 which is mechanically connected to a first eccentric weight pulley 566, so that the first eccentric weight 559, the first eccentric weight shaft 565 and the first eccentric weight shaft gear 587 all rotate together in the opposite direction as the first eccentric weight drive gear 588 and the first eccentric weight pulley 566. A first endless belt 567 surrounds the first shaft pulley 521 and the first eccentric weight pulley 566. The second eccentric weight 560 is keyed to a second eccentric weight shaft 569 which is keyed to a second eccentric weight shaft gear 589, which is mated to a twin second eccentric weight drive gear 590 which is mechanically connected to a second eccentric weight pulley 570, so that the second eccentric weight 560, the second eccentric weight shaft 569 and the second eccentric weight shaft gear 589 all rotate together in the opposite direction as the second eccentric weight drive gear 590 and the second eccentric weight pulley 570. A second endless belt 571 surrounds the first shaft pulley 521 and the second eccentric weight pulley 570. The third eccentric weight 561 is keyed to a third eccentric weight shaft 574 which is keyed to a third eccentric weight pulley 575, so that the third eccentric weight 561, the third eccentric weight shaft 574 and the third eccentric weight pulley 575 all rotate together. A third endless belt 576 surrounds the second shaft pulley 529 and the third eccentric weight pulley 575. The fourth eccentric weight 562 is keyed to a fourth eccentric weight shaft 578 which is keyed to a fourth eccentric weight pulley 579, so that the fourth eccentric weight 562, the fourth eccentric weight shaft 578 and the fourth eccentric weight pulley 579 all rotate together. A fourth endless belt 580 surrounds the second shaft pulley 429 and the fourth eccentric weight pulley 579.

The first eccentric weight 559 and the second eccentric weight 560 form a set of primary eccentric weights. The third eccentric weight 561 and the fourth eccentric weight 562 form a set of secondary eccentric weights. The first eccentric weight 559 and the second eccentric weight 560 forming the set of primary eccentric weights rotate in a different plane than the plane of rotation of the third eccentric weight 561 and the fourth eccentric weight 562, which form the set of secondary eccentric weights. Because the primary eccentric weights rotate in a different plane than the secondary eccentric weights, the weights can be placed closer to the first shaft 522 allowing for a smaller shaker housing 555 and a more compact system.

A drive belt 583 surrounds the second shaft pulley 429 and a drive pulley 584 connected to a motor 585.

In operation, the set of primary eccentric weights (first and second eccentric weights 559, 560) may first be in phase with the set of secondary eccentric weights (third and fourth eccentric weights 561, 562). Being in phase means that lines 591 between the center of masses 592 of the first, second, third, and fourth eccentric weights 559, 560, 561, 562 and the axes of rotation of the first, second, third, and fourth eccentric weights 559, 560, 561, 562, respectively, are all perpendicular to moment arms 593 extending from the axis of oscillation to the axes of rotation of the eccentric weights at the same time, as shown in FIG. 19. The maximum oscillation force and amplitude is achieved when the set of primary and secondary eccentric weights are in phase.

The set of primary eccentric weights (first and second eccentric weights 559, 560) are in a phased relationship with the set of secondary eccentric weights (third and fourth eccentric weights 561, 562). Being in a phased relationship is defined in the specification and claims when the primary and secondary weights are being driven at the same angular speed, either in the same or opposite directions.

The drive belt 583 drives the second shaft pulley 529, which drives the rotary actuator 515, which drives the first shaft pulley 521. When rotating, the set of primary and secondary eccentric weights cause a rotational oscillation about an axis of oscillation, which passes through the first shaft 522. Using the definition above that phase angle is defined as the angle that the lines between centers of mass of the secondary weights (third and fourth eccentric weights 561, 562) and the axes of rotation of the secondary weights is from being perpendicular to the moment arm extending from the axis of oscillation to the axes of rotation of the secondary weights, when lines extending from the centers of mass of the primary weights (first and second eccentric weights 559, 560) to the axes of rotation of the primary weights are perpendicular to the moment arm extending from the axis of oscillation to the axes of rotation of the primary weights, so that when the primary and secondary weights are in phase, the phase angle is zero.

When a phase controller, as described in previous embodiments is set to change the phase angle q, hydraulic pressure is applied to the first port 539, which applies hydraulic pressure through the first groove 545 to the first channel 550. The hydraulic pressure in the first channel 550 causes fluid to pass into a chamber between the inner hub 516 and outer housing 517 of the rotary actuator 515 causing the inner hub to rotate (in this example in a clockwise direction) with respect to the outer housing. This causes the first shaft pulley 521 to rotate (in this example in a clockwise direction) with respect to the second shaft pulley 529. This changes the set phase angle of the phased relationship between the set of primary eccentric weights and the set of secondary eccentric weight. When the desired phase angle in the phased relationship between the set of primary eccentric weights and secondary eccentric weights is achieved, the hydraulic pressure applied to the first port 539 is stopped. The phase angle q is shown with the secondary weights in phantom lines in FIG. 19. Since the set of primary eccentric weights are rotating out of phase with the set of secondary eccentric weights, the oscillation force created by the set of primary and secondary eccentric weights is reduced as a function of cosine q. Vented hydraulic fluid passes from the rotary actuator 515 through the second channel 551, through the second groove 546 to the second port 540, to a reservoir.

To reverse the phase change by applying hydraulic pressure to the first port 539, hydraulic pressure is applied to the second port 540, which applies hydraulic pressure through the second groove 546 to the second channel 551. The hydraulic pressure in the second channel 551 causes fluid to pass into a chamber between the inner hub and outer housing of the rotary actuator 515 causing the inner hub to rotate (in this example in a counter-clockwise direction) with respect to the outer housing. This causes the first shaft pulley 521 to rotate (in this example in a counter-clockwise direction) with respect to the second shaft pulley 529. Vented hydraulic fluid passes from the rotary actuator 515 through the first channel 550, through the first groove 545 to the first port 539, and then to the reservoir.

The rotary valve 536 allows a hydraulic connection between a stationary hydraulic system and the rotating hydraulic actuator 515 without the use of high pressure seals. The drain groove 547 and the second drain port 542 collect high pressure leakage, which passes along the inner cylinder 537 surface from the first groove 545 and the second groove 546, and diverts the leakage to the reservoir. The high pressure leakage in the rotary valve 536, provides some of the lubrication of the rotary valve 536. An additional port, is dedicated to providing additional lubrication to the rotary valve 536. Pilot operated check valves on the rotary actuator 515 are provided so that torque variations between the primary and secondary weight sets or leakage from the rotary valve 536 will not cause a phase shift.

As with the previous embodiment, this embodiment allows an on the fly change of phased relationship (by changing from a first phase angle to a second phase angle) between the set of primary eccentric weights and the set of secondary eccentric weights as both sets of weights are rotated. The rotary actuators are known in the art. An example of a rotary actuator is described in U.S. Pat. No. 4,823,678. Various rotary actuators, with a housing that may be spun at a high speed may be used in other embodiments of the invention.

Other embodiments of the invention may have different numbers of weights in the sets of primary and secondary weights. Hydraulic motors may be replaced by other power means. The rotating brush may be replaced by a clamp for tree shaking. The brush may also be replaced by a U-shaped frame to provide a grape harvester which shakes the stumps of a grape vine as described in U.S. Pat. No. 4,286,426 incorporated by reference. The belt and pulley drive means may be replaced by equivalent direct drive means, such as gears or chains and sprockets.

Although the best mode contemplated for carrying out the present invention has been herein shown and described, it will be understood that modification and variation may be made without departing from what is regarded to be the subject matter of the invention.

What is claimed is:

1. An apparatus for providing angular oscillation, comprising:
    a set of primary eccentric weights;
    a set of secondary eccentric weights;
    a means for driving the set of primary eccentric weights, mechanically connected to the set of primary eccentric weights;
    a means for driving the set of secondary eccentric weights mechanically connected to the set of secondary eccentric weights; and
    a rotary actuator, mechanically connected between the means for driving the set of secondary eccentric weights and the means for driving the set of primary eccentric weights, for causing a phase change between the set of secondary eccentric weights and the set of primary eccentric weights.

2. The apparatus according to claim 1, wherein the rotary actuator, comprises:
    an inner hub; and
    an outer housing surrounding the inner hub, wherein a fluid chamber is formed between the inner hub and the outer housing, and wherein a sum of masses of the secondary weights times eccentricities of the secondary weights is less than a sum of masses of the primary weights times eccentricities of the primary weights.

3. The apparatus according to claim 2, further comprising, a rotary valve, comprising:
    an inner cylinder in fluid connection with the rotary actuator; and
    an outer shell surrounding the inner cylinder, with a first port a second port and a drain port, and wherein the inner cylinder has a first groove adjacent to the first port and a first channel in fluid connection with the first groove and the rotary actuator and a second groove adjacent to the second port and a second channel in fluid connection weigh the second groove and the rotary actuator, and a drain groove adjacent to the drain port.

4. The apparatus according to claim 3, wherein the means for rotating the set of primary eccentric weights, comprises;
    a first pulley;
    a primary weight pulley mechanically connected to at least one primary weight in the set of primary weights; and
    an endless belt surrounding the first pulley and the primary weight pulley.

5. The apparatus according to claim 4, wherein the means for rotating the set of secondary eccentric weights, comprises:
    a second pulley;
    a secondary weight pulley mechanically connected to at least one secondary weight in the set of secondary weights;
    an endless belt surrounding the second pulley and the secondary weight pulley.

6. The apparatus, according to claim 1, further comprising:
    a frame;
    a plurality of wheels supporting said frame; and
    means for removing fruits from the plant supported by said frame and mechanically connected to the set of primary eccentric weights and the set of secondary eccentric weights.

7. The apparatus according to claim 6, wherein the rotary actuator, comprises:
an inner hub; and
an outer housing surrounding the inner hub, wherein a fluid chamber is formed between the inner hub and the outer housing.

8. The apparatus according to claim 7, further comprising, a rotary valve, comprising:
an inner cylinder in fluid connection with the rotary actuator; and
an outer shell surrounding the inner cylinder, with a first port a second port and a drain port, and wherein the inner cylinder has a first groove adjacent to the first port and a first channel in fluid connection with the first groove and the rotary actuator and a second groove adjacent to the second port and a second channel in fluid connection weigh the second groove and the rotary actuator, and a drain groove adjacent to the drain port.

9. The apparatus according to claim 8, wherein the means for rotating the set of primary eccentric weights, comprises;
a first pulley;
a primary weight pulley mechanically connected to the at least one primary weight in the set of primary weights; and
an endless belt surrounding the first pulley and the primary weight pulley.

10. The apparatus according to claim 9, wherein the means for rotating the set of secondary eccentric weights, comprises:
a second pulley;
a secondary weight pulley mechanically connected to at least one secondary weight in the set of secondary weights;
an endless belt surrounding the second pulley and the secondary weight pulley.

11. An apparatus for providing angular oscillation, comprising:
a set of primary eccentric weights;
a set of secondary eccentric weights;
means for rotating the set of primary eccentric weights at a first speed;
means for rotating the set of secondary eccentric weights at the first speed, wherein there is a first phase angle between the rotation of the set of primary eccentric weights and the set of secondary eccentric weights;
a controller for designating a second phase angle; and
means for changing the phase angle between the rotation of the primary eccentric weights and the secondary eccentric weights from the first phase angle to the second phase angle, while the set of primary eccentric weights and the set of secondary eccentric weights are rotating.

12. The apparatus, as recited in claim 11, further comprising:
a frame;
a plurality of wheels supporting the frame; and
a harvesting mechanism for removing the fruits from the plants, supported by the frame and mechanically connected to the set of primary eccentric weights and the secondary eccentric weights.

13. The apparatus, as recited in claim 12, wherein the set of primary eccentric weights, comprises:
a first primary eccentric weight, that rotates around a first primary axis; and
a second primary eccentric weight, that rotates around a second primary axis, spaced apart from the first primary axis, and wherein the set of secondary eccentric weights, comprises:
a first secondary eccentric weight, that rotates around a first secondary axis; and
a second secondary eccentric weight, that rotates around a second secondary axis, spaced apart from the first secondary axis.

14. The apparatus, as recited in claim 13, further comprising an axis of oscillation about which the harvesting mechanism oscillates, wherein the first primary axis and the second primary axis are on opposite sides of the axis of oscillation, and wherein the first secondary axis and the second secondary axis are on opposite sides of the axis of oscillation.

15. The apparatus, as recited in claim 14, wherein the means for changing the phase angle, comprises a rotary actuator.

16. The apparatus, as recited in claim 13, wherein the set of primary eccentric weights rotates in the same direction as the rotation of the set of secondary eccentric weights.

17. The apparatus, as recited in claim 13, wherein the set of primary eccentric weights rotates in an opposite direction as the rotation of the set of secondary eccentric weights.

18. The apparatus, as recited in claim 11, wherein the set of primary eccentric weights, comprises:
a first primary eccentric weight, that rotates around a first primary axis; and
a second primary eccentric weight, that rotates around a second primary axis, spaced apart from the first primary axis, and wherein the set of secondary eccentric weights, comprises:
a first secondary eccentric weight, that rotates around a first secondary axis; and
a second secondary eccentric weight, that rotates around a second secondary axis, spaced apart from the first secondary axis, and wherein a sum of masses of the secondary weights times eccentricities of the secondary weights is less than a sum of masses of the primary weights times eccentricities of the primary weights.

19. The apparatus, as recited in claim 18, further comprising an axis of oscillation about which the harvesting mechanism oscillates, wherein the first primary axis and the second primary axis are on opposite sides of the axis of oscillation, and wherein the first secondary axis and the second secondary axis are on opposite sides of the axis of oscillation.

20. The apparatus, as recited in claim 19, wherein the means for changing the phase angle, comprises a rotary actuator.

21. The apparatus, as recited in claim 11, wherein the means for changing the phase angle, comprises a rotary actuator, and further comprising, a reservoir.

22. The apparatus according to claim 21, further comprising, a rotary valve, comprising:
an inner cylinder in fluid connection with the rotary actuator; and
an outer shell surrounding the inner cylinder, with a first port a second port and a drain port, and wherein the inner cylinder has a first groove adjacent to the first port and a first channel in fluid connection with the first groove and the rotary actuator and a second groove adjacent to the second port and a second channel in fluid connection with the second groove and the rotary actuator, and a drain groove adjacent to the drain port, wherein the drain port is in fluid connection with the reservoir.

* * * * *